United States Patent
May

(10) Patent No.: US 7,302,867 B2
(45) Date of Patent: Dec. 4, 2007

(54) MAGNETIC TRANSDUCER TORQUE MEASUREMENT

(75) Inventor: Lutz Axel May, Gelting (DE)

(73) Assignee: Abas, Inc., Chicago, IL (US)

( * ) Notice: Subject to any disclaimer, the term of this patent is extended or adjusted under 35 U.S.C. 154(b) by 0 days.

(21) Appl. No.: 10/948,133

(22) Filed: Sep. 24, 2004

(65) Prior Publication Data

US 2005/0061088 A1   Mar. 24, 2005

Related U.S. Application Data

(62) Division of application No. 10/297,980, filed on Apr. 23, 2003.

(30) Foreign Application Priority Data

Jun. 14, 2000 (GB) ................................. 0014568.0
Oct. 12, 2000 (GB) ................................. 0025036.5
Jun. 7, 2001 (WO) ..................... PCT/EP01/06482

(51) Int. Cl.
*G01L 3/00* (2006.01)
*H01F 1/03* (2006.01)

(52) U.S. Cl. ................... 73/862.331; 148/103

(58) Field of Classification Search ........... 73/862.331, 73/862.333, 862.335, 862.69, 862.332, 862.334, 73/862.336; 324/221, 253, 200; 148/103
See application file for complete search history.

(56) References Cited

U.S. PATENT DOCUMENTS

| | | | |
|---|---|---|---|
| 3,246,219 A * | 4/1966 | Devol et al. ................. | 318/569 |
| 3,435,392 A * | 3/1969 | Ouellette et al. ........... | 335/230 |
| 3,735,369 A * | 5/1973 | Iida .............................. | 365/157 |
| 3,746,937 A * | 7/1973 | Koike .......................... | 318/122 |
| 4,990,812 A * | 2/1991 | Nam ........................... | 310/261 |
| 5,202,599 A * | 4/1993 | Kao ............................ | 310/234 |
| 5,336,998 A * | 8/1994 | Watts et al. ................ | 324/235 |
| 5,708,216 A * | 1/1998 | Garshelis ............... | 73/862.335 |
| 5,889,215 A | 3/1999 | Kilmartin et al. | |
| 6,037,767 A * | 3/2000 | Crescenzo et al. .......... | 324/220 |
| 6,145,387 A * | 11/2000 | Garshelis ............... | 73/862.336 |
| 6,330,833 B1 * | 12/2001 | Opie et al. ............. | 73/862.333 |
| 6,581,480 B1 | 6/2003 | May et al. | |
| 6,891,287 B2 * | 5/2005 | Moret ......................... | 310/36 |
| 6,910,391 B1 * | 6/2005 | May ..................... | 73/862.333 |
| 6,959,612 B2 * | 11/2005 | May ..................... | 73/862.331 |

FOREIGN PATENT DOCUMENTS

| | | |
|---|---|---|
| WO | WO 99/56099 | 11/1999 |
| WO | WO 01/79801 A2 | 10/2001 |
| WO | WO 01/79801 A3 | 10/2001 |

* cited by examiner

*Primary Examiner*—Michael Cygan
*Assistant Examiner*—Octavia Davis
(74) *Attorney, Agent, or Firm*—Blank Rome LLP

(57) ABSTRACT

A magnetic transducer element is formed by rotating an integral region of a shaft about an axis in the presence of a magnetic source. An annulus of magnetization results in having its magnetization in the axial direction. The exterior magnetic field emanated by the annulus exhibits respective axial magnetic profiles of its axially and radially directed components which have an axial shift under torque. The direction of profile shift depends on the rotational direction of the shaft while magnetization proceeds. A pair of regions exhibiting opposite shift directions provide signals in which torque-dependent shift is separated from axial displacements of the shaft. An annulus of magnetization may be non-uniform with angle about the shaft axis. Measures to prevent eddy currents generated in the rotting region of the shaft under magnetization are disclosed as we "sweet spots" for sensor placement to mitigate non-uniformity effects.

7 Claims, 16 Drawing Sheets

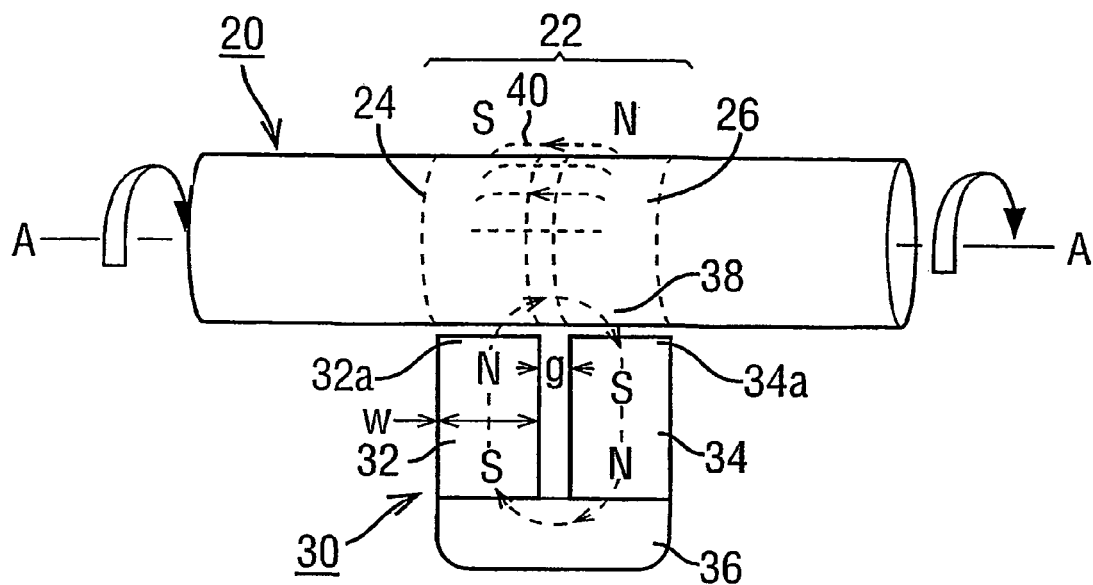
FIG. 1
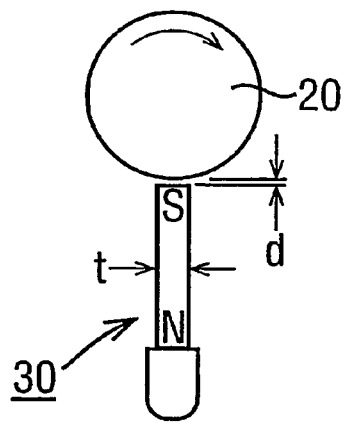
FIG. 2
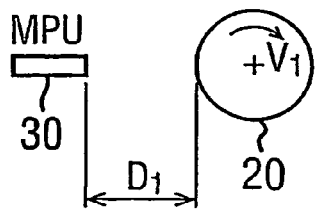 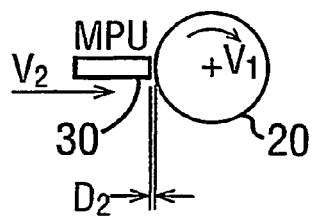 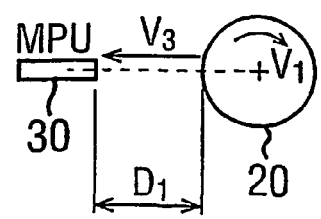
FIG. 3a          FIG. 3b          FIG. 3c

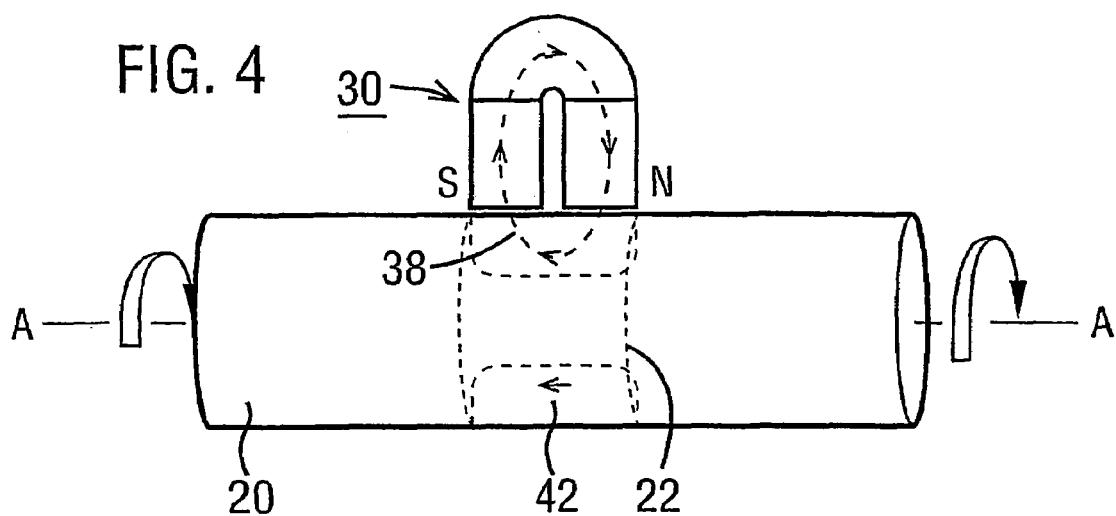
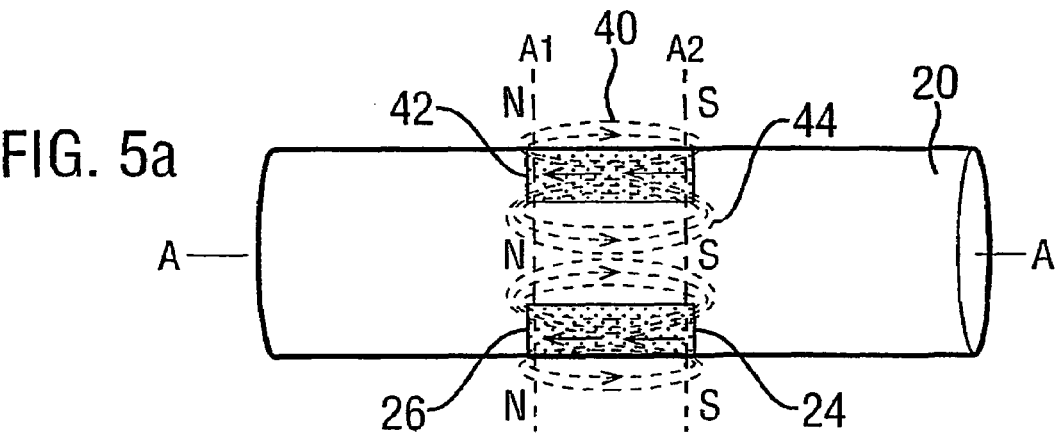
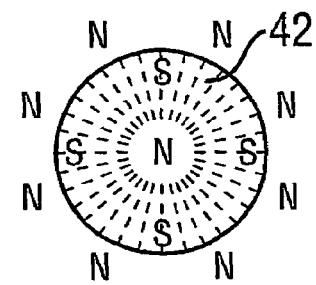 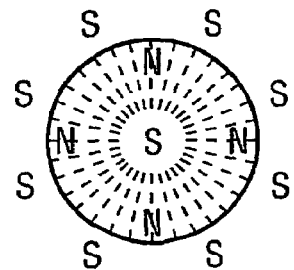
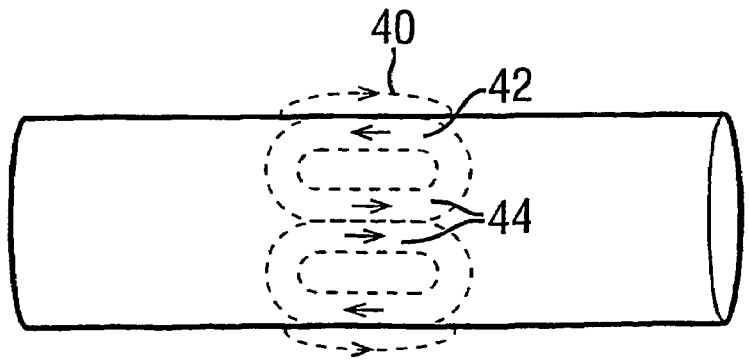

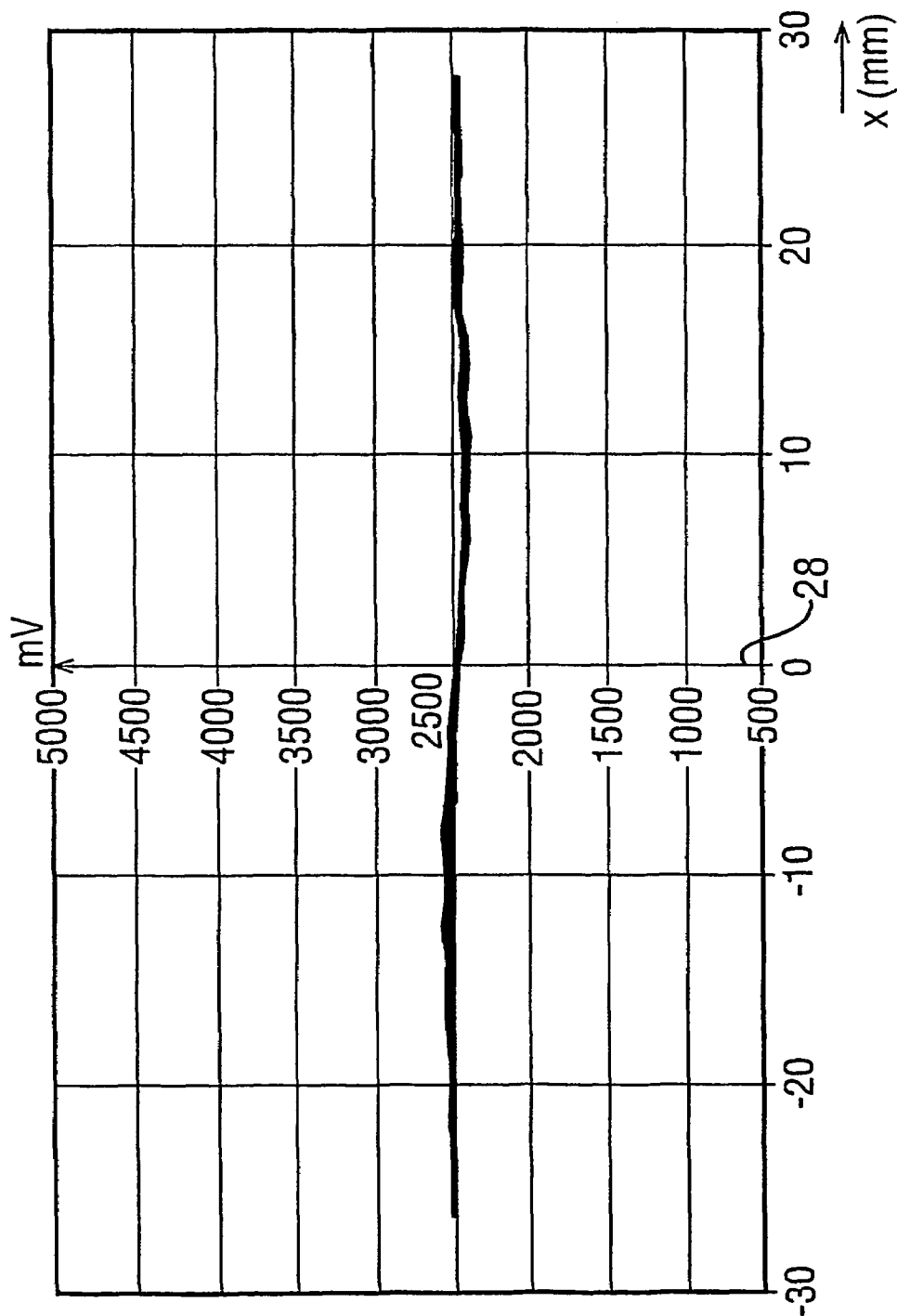

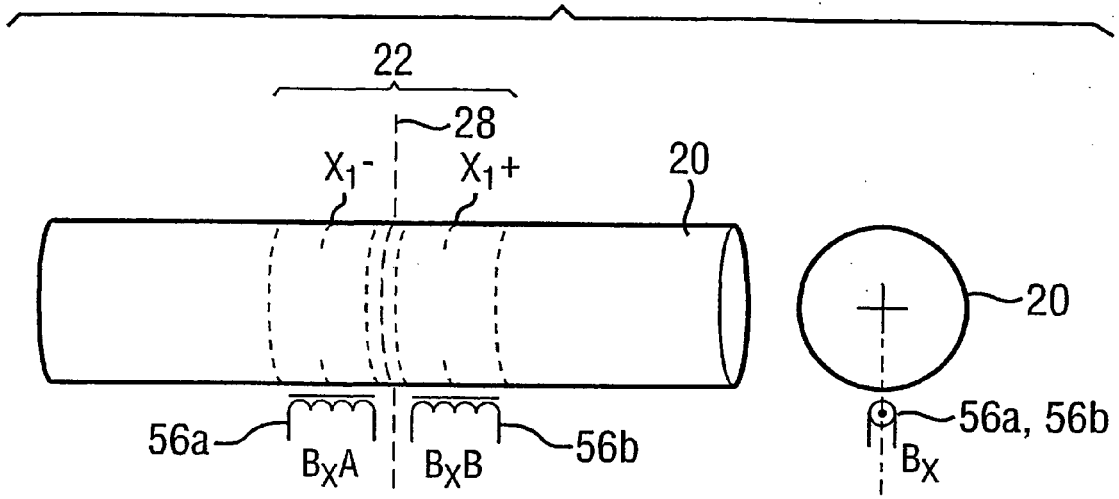

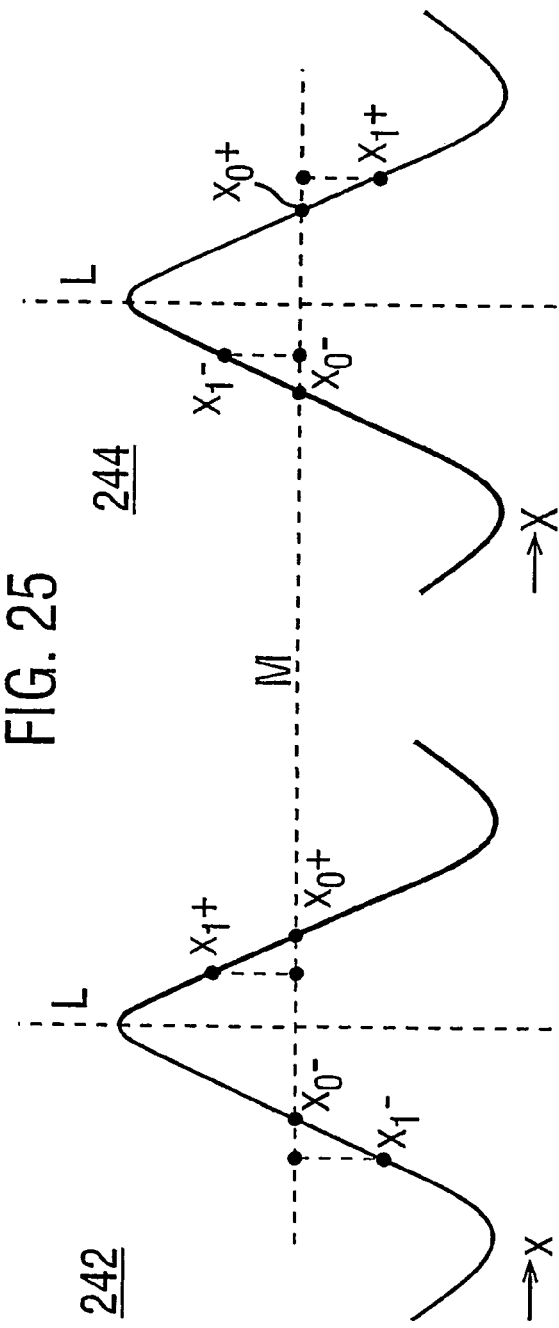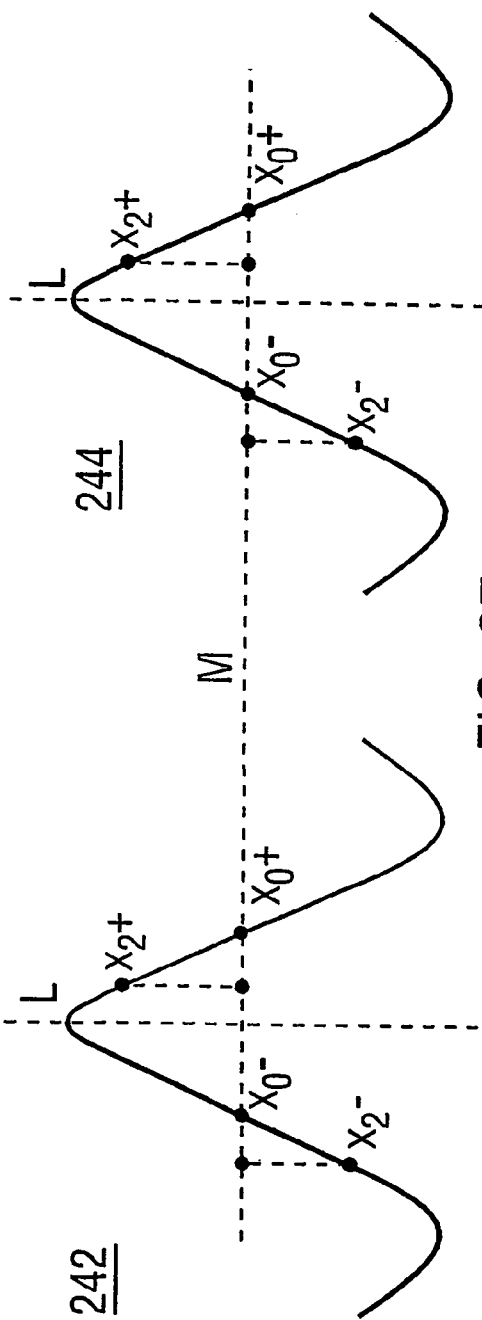

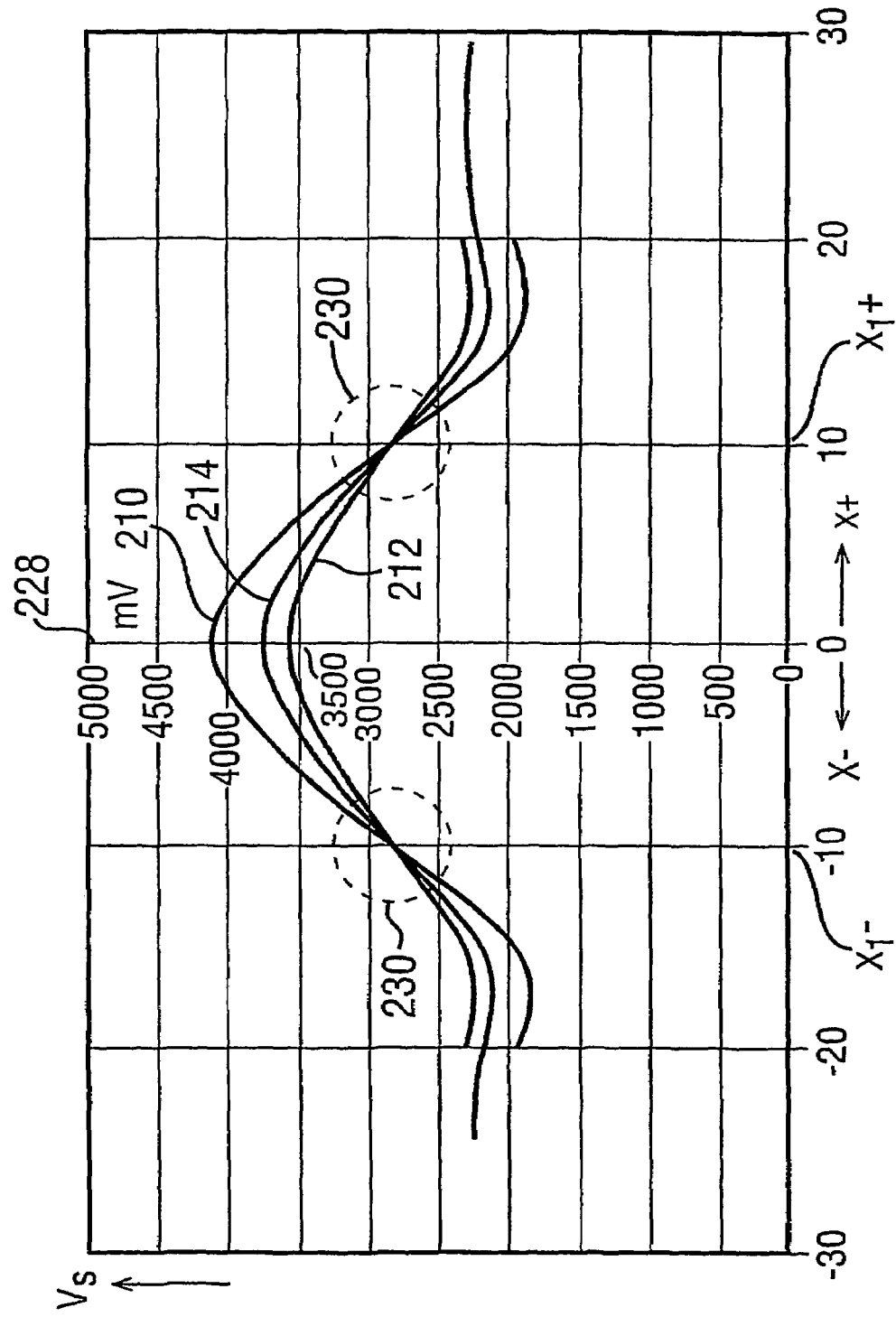

MAGNETIC TRANSDUCER TORQUE MEASUREMENT

This application is a divisional application of U.S. patent application Ser. No. 10/297,980, filed Apr. 23, 2003, which is based on International Application No. PCT/EP01/06482, filed Jun. 7, 2001.

FIELD OF THE INVENTION

This invention is concerned with the measurement of torque using a magnetic based transducer element assembly. The transducer element may also find application to the measurement forces generating bending moments acting on the element. More particularly, it is concerned with magnetic transducer elements which exhibit a form of torque-dependent magnetic field referred to herein as profile-shift longitudinal magnetisation. Such magnetisation is realised in a shaft, usually an integral portion of the shaft, as an annulus of magnetisation about the shaft axis which is in the direction of the shaft (extends longitudinally) and which emanates a detectable external field the profile of which takes in the direction of the axis shifts when torque is applied about the axis of the shaft.

The present invention is particularly concerned with problems which arise due to movement of the shaft under torque in the direction of its axis. The invention relates to a magnetic transducer element and to a transducer arrangement incorporating such an element. The invention also relates to a magnetic transducer system.

The invention is also concerned with to the reduction of non-uniformity of magnetisation in a torque transducer region with respect to the angle about the torque axis of the transducer region. The invention further relates to a method of magnetising a portion of a member destined to be used as a transducer element; and to the placement of magnetic field sensors in relation to a transducer region.

The invention will be particularly discussed and described in relation to the measurement of torque, and more particularly torque applied to a shaft in which the transducer element is an integral portion of the shaft. The shaft is assumed to be of magnetisable material, i.e. ferromagnetic material. The material is preferably chosen to be a hard magnetic material capable of achieving a high saturation and remanence and having a high coercivity. The magnetised regions employed in the practice of the present invention are regions of permanent magnetisation, which may also be referred to as stored or remanent magnetisation.

BACKGROUND TO THE INVENTION

There have been various developments in recent years in the use of magnetic-based transducers for sensing torque in shafts. These have the advantage of being realisable in non-contacting assemblies—particularly useful for rotating shafts. The magnetised transducer element is mounted on or integral with the shaft and the sensor arrangement responsive to the torque-dependent magnetic field emanated by the transducer element is disposed out of mechanical contact with the shaft.

One form of known transducer element is that dependent on circumferential or circular magnetisation which forms a closed loop around the axis of the shaft. The magnetisation itself is transverse to the torque axis and forms a closed loop or annulus about the torque axis. Examples of this form of magnetisation applied in an integral portion of a shaft are disclosed in published PCT application WO99/56099. The exterior torque-dependent magnetic field that is sensed lies generally in the axial direction.

More recently, new forms of magnetisation of transducer elements have been developed. These are annular magnetisations about the shaft axis with the direction of magnetisation being in the direction of the shaft axis. Such an annulus of magnetisation produces a toroid of magnetic flux within the shaft and as an extension of the toroid an annulus of flux exterior to the shaft Such magnetisations are referred to as longitudinal in contrast to the above-noted circumferential magnetisation. One form of annular longitudinal magnetisation is referred to a circumferential-sensing longitudinal magnetisation in which the torque-dependent magnetic field that is sensed is a component in the circumferential or tangential direction with respect to the shaft axis. Transducers employing this form of longitudinal magnetisation are disclosed in published PCT application WO01/13081. Reference may also be had to published PCT application WO01/13082. Both these published applications are incorporated herein by reference.

A second form of annular longitudinal magnetiation is that referred to as profile-shift longitudinal magnetisation. This form of magnetisation is the subject of co-pending PCT application PCT/EP01/04077 filed $10^{th}$ Apr. 2001 which is incorporated herein by reference. A description of profile-shift longitudinal magnetisation is given hereinafter with reference to FIGS. 1-21 and is extracted from PCT/EP01/04077 and FIGS. 4-25 thereof.

In the transducer element disclosed in PCT/EP01/04077 (the '04077 application) the torque-dependent external field emanated by the transducer element has axially-directed and radial field profiles which are axially-shifted as a function of torque. This will be described subsequently and is a surprising result.

The profile is a measurement of the axially-directed or radial component of the exterior field as a function of position in the axial direction. More surprisingly in tests performed on a transducer element produced by the magnetisation process described in the '04077 application, it has been found that there is no detectable circumferential or tangential component: or at least any such component is so weak as to be lost in noise.

The creation of a transducer element having the above-mentioned field distribution characteristics is described below. The magnetisation of the element is accomplished by relative rotation about an axis of a shaft in a magnet system generally as illustrated in FIG. 6 of WO01/13081 but with some modification. A greater depth of magnetisation is obtained by using a magnet system comprising permanent magnets forming a horseshoe magnet using stronger magnets than were used previously. More particularly the magnet poles adjacent the shaft have been relatively wide in the axial direction as compared to the spacing or gap between them.

The process for creating the transducer element in a shaft falls broadly into two operations with a third operation that may follow: a magnetic preparation which may be referred to for brevity as de-gaussing or magnetic cleansing; and thereafter a magnetisation procedure. The magnetic preparation (pre-magnetisation procedure) to be described can be summarised as providing a magnetically cleansed part in which the desired magnetic field is then established. The magnetisation procedure may be followed by a post magnetisation procedure somewhat similar to the pre-magnetisation procedure.

It has been found that the exploitation of axial or radial shift profiles is of great utility in magnetic torque transducers. This will be discussed in detail below. However, in practice problems can arise in making accurate torque measurements of a shaft due to sensitivity to axial displacements of the shaft. Both produce an axial shift in the axial or radial profile utilised for measurement.

Another problem which arises in exploiting longitudinally magnetised transducer elements in general is that the annular magnetisation created by relative rotation between a member, such as a shaft, and a magnetic source (permanent or electromagnet) may result in a non-uniformity of magnetisation about the axis of rotation. This is referred to as rotational non-uniformity (RNU) or rotational signal uniformity (RSU).

SUMMARY OF THE INVENTION

A significant contribution to solving the problem of axial displacement of a shaft is based on an appreciation of the fact that if two transducer regions spaced along the axis of a shaft are magnetised in the same manner but with the relative rotation of the shaft to the magnet source (usually the shaft is rotated) being in one direction for the creation of one region and in the opposition direction for the creation of the other region, then the respective magnetic profiles for the two regions shift in opposite directions for a common direction of torque applied to both. In contrast, an axial displacement of the shaft produces the same direction of shift of both profiles relative to a fixed external detector arrangement. This difference enables torque and axial displacement shifts to be separated so that a torque measurement can be compensated for axial displacement of the shaft. Furthermore a measurement of axial displacement can be obtained which is not affected by torque.

According to a first aspect of the present invention there is provided a magnetic transducer element as set forth in claim 1. The invention also provides a transducer arrangement using such a transducer element as is set forth in claim 9. A further aspect of the invention lies in the creation of the magnetic transducer element of claim 1 in accord with claim 8. A second aspect of the invention provides a magnetic transducer system as set forth in claim 19.

One reason for the NRU problem mentioned above may be the generation of eddy currents in a shaft being magnetised. Third and fourth aspects of the invention provide a method of magnetising a portion of a member as set forth in claims 23 and 26 respectively.

One technique for obtaining the best RSU for measurement purposes arises from the appreciation that there are "sweet spots" in the placement of magnetic field sensors in the axial direction where NRU effects are reduced. A fifth aspect of the invention provides a transducer arrangement as set forth in claim 30.

The invention and preferred embodiments of it in its various aspects will now be described with reference to the accompanying drawings in which FIGS. 1-21 relate to the disclosure of earlier application PCT/EP01/04077 and FIGS. 22-31 relate to embodiments of the present invention.

BRIEF DESCRIPTION OF THE DRAWINGS

FIG. 1 shows a shaft having an integral portion thereof being magnetised in accordance with the disclosure of PCT/EP01/04077;

FIG. 2 is an end view of the shaft and magnet assembly of FIG. 1;

FIGS. 3 to 3c illustrate steps in the magnetisation procedure for the shaft using the magnet assembly shown in FIGS. 1 and 2;

FIG. 4 is a diagrammatic representation of the magnetisation procedure;

FIG. 5a is an illustration of the magnetic flux established in the transducer element in a shaft, FIGS. 5b and 5c being sections on the lines A1 and A2 respectively, and FIG. 5d a further illustration of the transducer field;

FIG. 9 is a circumferential field magnetic profile;

FIG. 19 shows the placing of a pair of axially oriented sensors on the basis of FIG. 14;

FIG. 20 shows a magnetisation system and process to provide guard/keeper fields;

FIG. 21 shows diagrammatically the resultant fields in a shaft.

FIGS. 25 and 27 show an axial-magnetic profile with a torque-dependent shift and an axial displacement-dependent shift respectively relevant to the operation of the system of FIG. 24;

FIG. 30 illustrates amplitude profile curves defining "sweet spots" for sensor placement in an axial (in-line) embodiment of another aspect of the invention.

THE PRIOR PROPOSALS OF PCT/EP01/04077

Figure 6A:
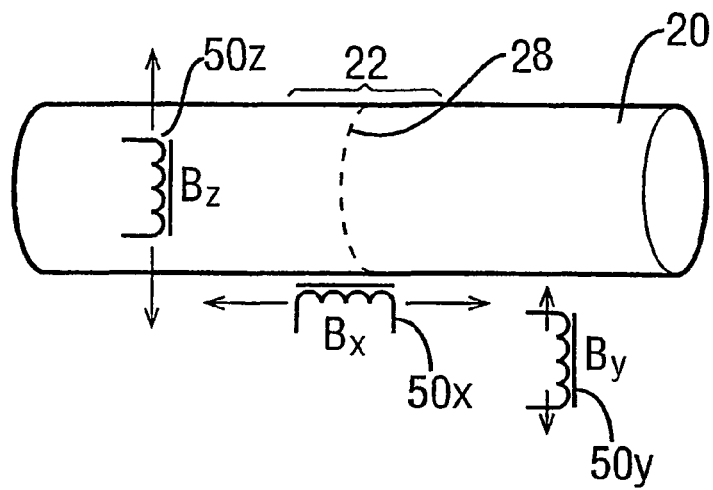
FIGS. 6a and 6b show sensor orientations for obtaining axial, radial and tangential magnetic profiles all to be taken as a function of axial position.

These prior proposals will be particularly described with reference to the magnetisation of a portion of a shaft to form a transducer element. The body or part in which the desired magnetisation is to be established may be more generally referred to as the sensor host. The section which next follows relates to the magnetisation of a magnetically clean, ferromagnetic sensor host. The magnetic preparation (pre-magnetisation) of the sensor host, specifically the shaft, is described subsequently as is the post-magnetisation procedure. The resultant transducer element is discussed in the context of non-contact sensing of a rotating shaft.

The Magnetising Assembly

FIG. 1 shows a magnetically-cleansed shaft 20 of circular cross-section subjectable to torque applied about its axis A-A. The shaft 20 may be mounted for rotation about axis A-A. The shaft has a solid cross-section. The direction of rotation is clockwise (cw) as referred to the shaft as seen from is right-hand end in the figure. FIG. 2 is a view from the right of FIG. 1. Mounted closely adjacent the circumference of a portion 22 of the shaft is a magnetic source 30 which comprises a magnet assembly with a pair of powerful magnets 32, 34 arranged radially lengthwise (in their NS direction) with respect to the shaft surface with opposite polarity. Their remote poles are connected by a flux concentrator 36 forming a low reluctance bridge between the magnets to assist in generating or concentrating the magnetic flux 38 from the opposite pole pieces or ends 32a, 34a entering the adjacent zone of portion 22 in order to magnetise it. The magnet assembly 30 thus provides a U-shape or horseshoe magnet acting in a radial plane. It is constructed in separate parts in order to make use of very powerful permanent magnets 32 and 34. The field strength achieved between the magnet poles and the sensor surface is greater than 4 kGauss and preferably in excess of 5 kGauss. This requires a minimal spacing between the magnets and the surface as will be discussed.

As can be seen from FIGS. 1 and 2, the magnets 32, 34 are aligned in the axial direction and the shaft 20 is rotated about axis A-A with respect to the magnets to induce South and North poles 24 and 26 in an annular zone about axis A-A of portion 22. The magnetisation extends around the circumference of the shaft inwardly from the surface of the shaft. The depth of the magnetisation achieved in portion 22 is also important as will be discussed below. Portion 22 provides a transducer element responsive to torque applied about the axis A-A of shaft 20 In FIGS. 1 and 2 the shaft is shown as rotating with respect to magnet assembly 30 but it will be understood that the desired relative rotation can be achieved by rotating the magnet assembly about the shaft or a combination of the two.

In the magnet assembly shown and used for the magnetised shaft, tests on which are reported below, the axial width w of each pole piece 32a, 34a (and of each magnet 32, 34) is substantially greater than the thickness t in the circumferential direction. Furthermore the gap g between the pole pieces 32a, 34a is also substantially less than the width w. By way of example, the nature of the externally-detectable magnetic field to be described more fully below was achieved by magnetisation performed on a shaft of 18 mm. diameter consisting of a high performance FV520B steel. Each magnet 32, 34 had a width w of 15 mm. and a thickness t of 4 mm. The gap g utilised was 2 mm. In the magnetisation process, the spacing d between the pole pieces 32a, 34a and the shaft surface was kept as far as possible below 2 mm. Increasing the gap will reduce signal gain (slope) and signal linearity. Signal gain is further discussed below. The magnetisation procedure seeks to magnetise the portion 22 to saturation to a depth such as indicated in FIG. 4 (annulus 42). Also diagrammatically shown in FIG. 1 is the magnetic flux 40 that is emanated exteriorly of the shaft portion 22 between the North and South poles 24 and 26. It is this exterior flux and its behaviour under torque which has yielded the surprising results to be described.

The Magnetising Procedure

More detail will now be given with reference to FIGS. 3a-3c of the magnetising procedure or magnetic programming as it may also be called. In practice the movements and their timing will be effected by means of an appropriately constructed machine. The magnetic source or magnetic programming unit (MPU) will be assumed to be the single horseshoe assembly 30 already described. Again it is assumed that the shaft to be magnetised has been magnetically cleansed.

In FIGS. 3a-3c, MPU 30 is shown in a sequence of steps 1), 2) and 3) in which it is moved along a radially-directed axis toward the rotating shaft 20 from a neutral or non-active position (FIG. 3a) to a fully magnetically engaged position (FIG. 3b) and then back to a neutral position (FIG. 3c). The distance $D_1$ is the spacing between the MPU 30 and the shaft surface in the neutral position while $D_2$ is the minimum spacing (d in FIG. 2) in the fully magnetically engaged position. The shaft rotates at an angular velocity $V_1$. The linear speed with which the MPU 30 moves forward toward the shaft 10 is $V_2$, while the speed of retraction from the shaft is $V_3$.

The environment in which the magnetisation procedure is performed should be as free as possible from the generation of magnetic fields that could influence the programming of shaft 20 with the desired magnetic field. In particular any means by which the MPU 30 is moved should be designed to avoid setting up unwanted fields in the vicinity of the shaft. Magnetisation proceeds as follows:

Step 1) (FIG. 3a): While MPU (30) is located in its non-active position at distance D1 from the shaft 10, the shaft commences rotation at an angular velocity $V_1$ which is maintained constant throughout the procedure. D1 is sufficient that any magnetic flux directly or indirectly from the MPU will not have any permanent effect on the shaft host.

The rotational speed $V_1$ is not critical but as stated it is important to keep it constant through the entire magnetisation procedure. In general $V_1$ may lie in the range 10-3000 rpm. One factor to be taken into account in setting the value of $V_1$ is a parameter called zero-torque offset. This is discussed further below.

Step 2) (FIG. 3b): Having established rotation of the sensor host at $V_1$, the MPU 30 is then moved toward the shaft 10 at relatively slow speed $V_2$. The value of $V_2$ is partially dependent on $V_1$. At higher values of $V_1$, $V_2$ can be increased. Typically at $V_1$=2800 rpm, $V_2$ can be 1 to 2 mm/sec. It is generally desirable to move the MPU as close to the shaft surface as possible consistent with avoiding the permanent magnets contacting the surface, i.e. the fully magnetically engaged position—see also FIG. 4. Contact may modulate the rotational speed of the shaft or the movement of a control mechanism guiding the MPU. The distance $D_2$ between the MPU and the surface of the sensor host should not only be made as small as possible but should be maintained constant to a high degree of accuracy. To this end a feedback control means for sensing the position of the MPU 30 with respect to the surface of the sensor host can be employed so as to achieve the desired control.

The MPU is maintained in the fully magnetically engaged position for a number of rotations to achieve saturation magnetisation of the portion 22 of the shaft. It is presently preferred that the depth of magnetisation be more than 30% of the radius of the shaft but going beyond a depth of 60% may reduce the sensor performance.

Step 3) (FIG. 3c); While still maintaining shaft rotation at $V_1$, the MPU is retracted or withdrawn from the fully magnetically engaged position to the neutral position at a speed $V_3$ directly related to $V_1$. Once back in the neutral position the rotation of the shaft is stopped and the shaft can be removed. The shaft should now have a well-defined magnetisation of the portion 22 as indicated in FIG. 1. The nature of this magnetisation is further described with reference to FIGS. 4, and 5a to 5c. $V_3$ would normally be substantially less than the forward advance speed $V_2$. For a value of 2800 rpm, a value of $V_2$ of 1-2 mm/sec has been mentioned: a value of $V_3$ of 0-5 mm/sec or less would be appropriate for retraction, preferably 0.25 mm/sec or even less. The retraction should not engender any disturbance of the desired magnetisation established in Step 2).

Step 4) (optional): The magnetised shaft may be subjected to a post-magnetisation stage which is similar to but carried out at a lower level than the pre-magnetisation cleansing described below.

Before moving on to FIGS. 4 and 5a-5c, the concept of zero-force offset will be explained. This was mentioned in Step 1 with reference to the choice of rotational velocity $V_1$.

Start with the situation in which the shaft is magnetised as described above under zero or near-zero torque in the shaft. As will become more apparent from the response graphs discussed below, when the magnetised portion is used as a torque transducer element, it provides a magnetic field output which a) is a function of torque, b) has a polarity that is dependent on the direction of torque, clockwise (cw) or counter-clockwise (ccw), and c) has an essentially zero value at zero torque. However, if the magnetisation procedure is performed while the shaft is under torque, that will be the torque at which the output signal passes through zero. On relaxing the shaft to zero torque a non-zero quiescent output is obtained. The polarity of the quiescent output depends on the direction of the torque applied in magnetization. The phenomenon can be put to practical effect in a technique known as pre-torquing disclosed in published PCT application WO00/57150.

The magnetisation procedure described above may be applied to form multiple transducer elements along the shaft sequentially, or simultaneously with an appropriate number of MPUs. The elements may be given different polarities and, if required, be pre-torqued. Present practice indicates a preference for magnetising different axial portions of the shaft pertaining to different transducer elements simultaneously. This lessens the possibility of the strong field used for magnetising a subsequent portion affecting a previously magnetised portion. Multiple magnetised portions can also be employed where a transducer element portion is flanked by guard or keeper portions each of opposite polarity of magnetisation to the transducer portion (FIG. 20).

FIG. 4 is a side view of the rotating shaft showing the magnetisation of portion 22 during step 2) of FIG. 3b. the MPU 30 is in the fully engaged position and the generated flux 38 magnetises an annular region 42. The magnetisation in this region is axially-directed.

The nature of the deep axially-directed magnetisation achieved with the above procedure will be more fully described with reference to FIGS. 5a-5d.

FIG. 5a shows an axial cross-section of a shaft 20 having a portion 22 magnetised by the steps described above to provide the annular region 42 (shown shaded) having North and South poles 26 and 24. The poles are, of course, not as clearly delimited as the drawing shows for clarity of illustration.

FIGS. 5b and 5c are radial cross-sections taken on A1 and A2 respectively in FIG. 5a The cross-sections are drawn to indicate the flux polarity as seen looking towards portion 22 from the outside. Thus FIG. 5b shows the internal flux of region 42 directed (S) toward the North pole of the region while FIG. 5c shows the internal flux directed (N) away from the South pole of region 42. The annular magnetised region forms a closed magnetic loop 44 interiorly of the region and a lesser external loop 40 is established outside the shaft. Both loops will be of toroidal form about shaft axis A-A.

Figure 7:
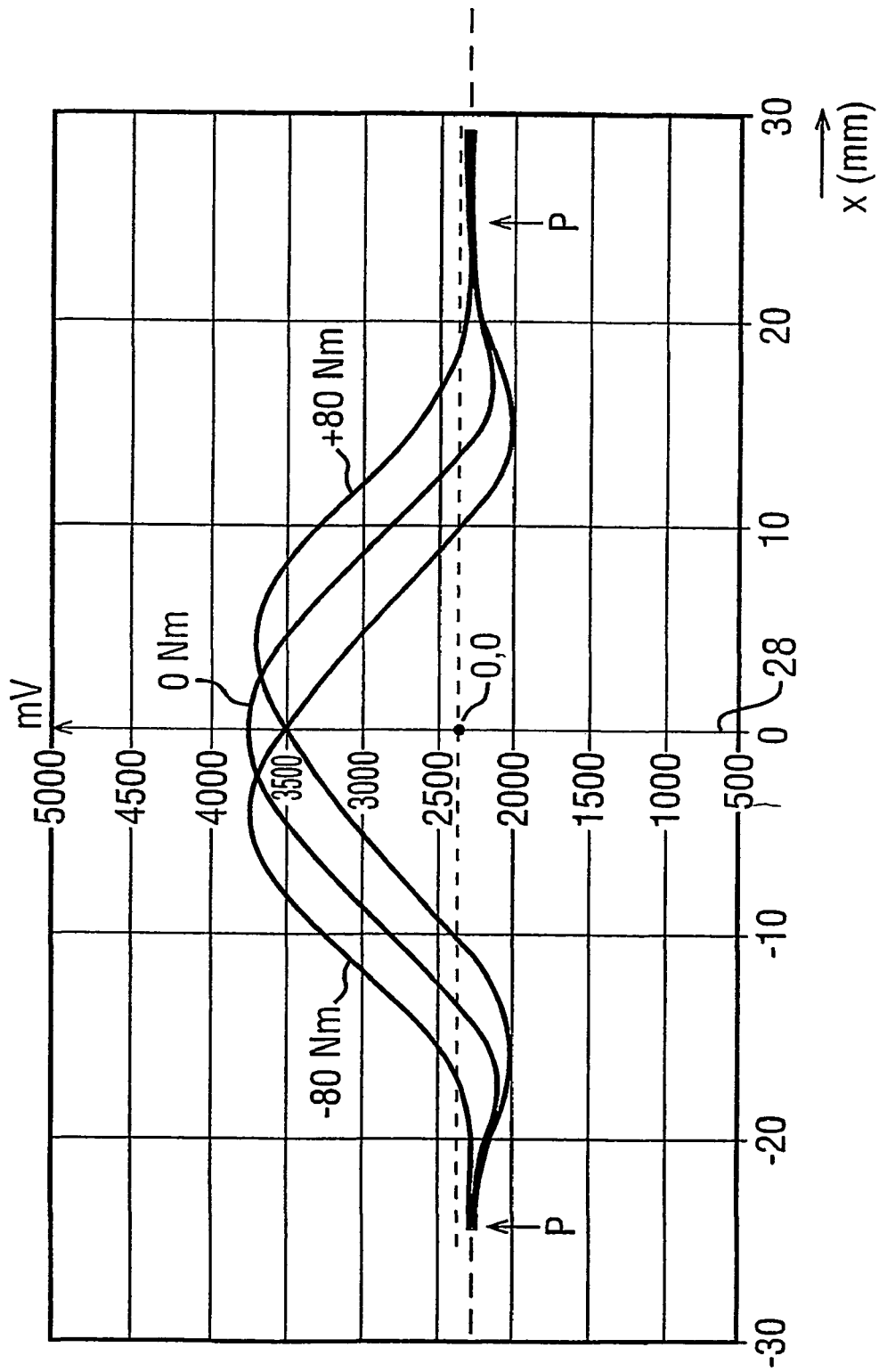
FIG. 7 is an axial field magnetic profile.
Figure 8:
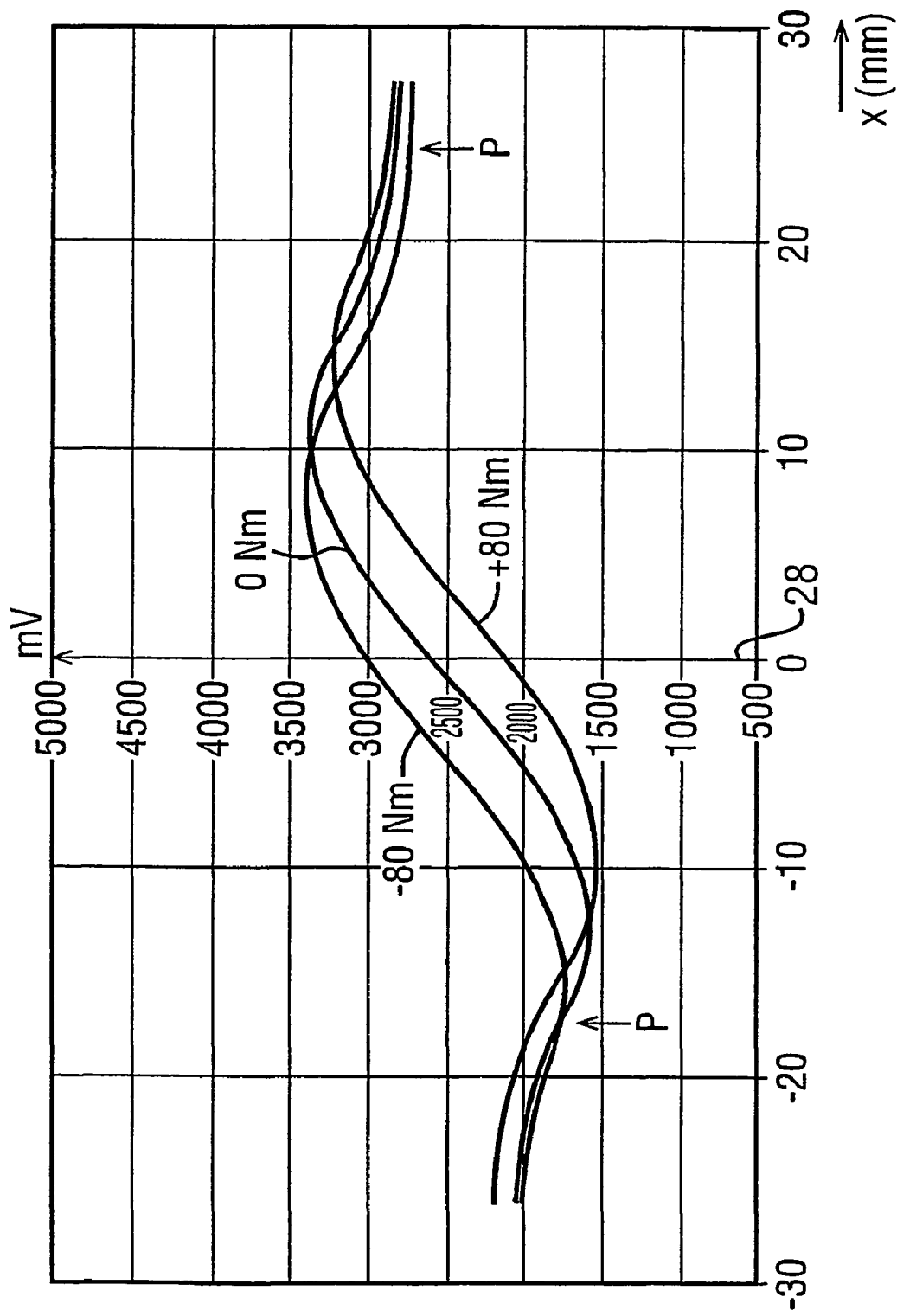
FIG. 8 is a radial field magnetic profile.

Experiments have shown that the inner surface of the loop 44 becomes of essentially zero or near zero radius. This is indicated by the polarities shown at the centre of each of FIGS. 5b and 5c and is further diagrammatically illustrated by the flux distribution of FIG. 5d. This enhanced magnetisation flux distribution through the axial core of shaft 20 is a function of the radial depth of the region 42. As already mentioned, this region is magnetised to saturation. The experimental results reported below with reference to FIGS. 7, 8 and 9 are for a shaft 10 magnetised in accord with the steps above described to have the kind of flux distribution just described. It will be appreciated by those skilled in the art that the determination of flux distribution within solid magnetised objects is not easy. In the investigations we have performed probes have been inserted in fine axially-directed bores within the shaft.

For practical torque measurement purposes, the field distribution used is that of the external field 40. The practical consequences of producing a transducer element by means of the magnetisation procedure described above are surprising and unexpected.

External Magnetic Field Profiles

There will now be described the measurement of magnetic field profiles made with a shaft having a portion magnetised in accord with the magnetisation procedure described and bounded axially by non-magnetic portions, which like the magnetised portion were previously magnetically cleansed in the manner to be described. That is the whole shaft was cleansed in the manner to be described.

Figure 6B:
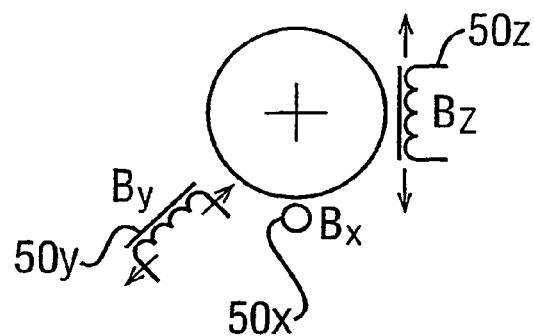

FIGS. 6a and 6b illustrate the three orientations of sensors B by which external field distribution is investigated. FIG. 6a shows a shaft 20 having a magnetised portion 22 as above described the centre of which in the axial direction is taken to be at radial plane 28. Three different magnetic profiles were measured using directional sensors oriented in the manner shown in FIGS. 6a and 6b. The sensors used were of the saturating inductor type such as described in PCT publication WO98/52063 in which the field sensitive inductor is typically a few millimetres in length. Other sensor devices commonly used for measuring magnetic fields are Hall effect sensors, the field sensitive element of which is very much smaller, and directional magnetoresistive sensors. All these sensors have a figure-of-eight response pattern with a broad angle of near maximum response and sharper nulls perpendicular to the axis of maximum response.

Three sets of measurements were performed using three different sensor orientations with respect to the shaft 10 as represented by inductors 50x, 50y, 50z in FIGS. 6a and 6b.

All measurements were made with the relevant sensor adjacent to but not in contact with the shaft surface. The shaft was rotated about its axis with a constant applied torque. Three different torque values were used. The measurements were taken one orientation at a time.

Sensor 50x is oriented in the axial direction (x-axis) also referred to as the in-line direction. Measurements of the magnetic field Bx parallel to the axis (the in-line field) as a function of x were made. The sensor was moved in the axial (x)-direction to obtain the field profile of FIG. 7.

Sensor 50y is oriented radially of the shaft axis A-A to provide a measurement of radial field $B_y$. It is also moved in the axial (x) direction to provide a profile of the radial field $B_y$ as a function of x at a constant radius. This profile is seen in FIG. 8.

Sensor 50z is oriented tangentially of the shaft to respond to the circumferential or tangential field $B_z$. It is also moved in the axial (x) direction to provide a profile of the tangential field $B_y$ as a function of x at a constant radial distance from the shaft. This profile is seen in FIG. 9.

The axial field, radial field and tangential field profiles given in the curves of FIGS. 7-9 respectively will now be further discussed. Each profile was obtained by means of the same sensor oriented in the appropriate 50x, 50y, 50z position of FIGS. 6a and 6b.

FIG. 7 shows three profiles of a shaft magnetised by the procedure described above with a sensor 50$_x$ mounted at 2.5 mm. from the shaft surface. The shaft is run at 2800 rpm and profiles were taken at torque values of 0 (zero), +80 and −80 Nm. The abscissa axis of the graph is the x distance from the axial centre 28 of the transducer. The ordinate axis is an output signal value in mV representing the sensed field. The output shows an offset. The ordinate zero is at about 2300 mV. The profile obtained is of similar shape for all three torques but it is seen that the profile shifts axially with torque. The zero torque curve peaks at the centre line 28. The peaks for the +80 and −80 Nm curves have the same peak magnitude as the zero torque curve but are shifted to opposite sides of the centre. Thus a torque causes an axial shift in the axial field $B_x$ the magnitude of which shift is a function of torque and the polarity of which is dependent on the polarity of the applied torque.

FIG. 7 also exhibits some other characteristics of interest. The measured $B_x$ field enters a region of opposite polarity adjacent the poles of region 22 before dropping towards zero as the sensor is moved away from the poles. The change in polarity is explained below with reference to FIGS. 10 and 11. The poles are at about ±15 mm. from the transducer centre line 28. The measured field polarity is in the same sense at the two pole regions but exhibits a torque-dependent differential in amplitude. It will be seen that as compared with the zero torque curve, which is near symmetrical about the x=0 point, the output measured in the region adjacent one pole (at about 15 mm. distance) is enhanced for one polarity of torque and decreased for the other polarity of torque but the enhancements/decreases are of opposite sense in the pole regions. It may be surmised that the axial field is being tilted from one pole towards the other with the direction of tilt dependent on torque.

Another characteristic, which appears also in FIG. 8, is that there appear to be points P adjacent but just axially outside the poles through which the curves all pass. These are referred to herein as pivotal points.

FIG. 8 is a similarly produced magnetic field profile, in this case for the radial field $B_y$. The sensor 50$_y$ is mounted at 2.5 mm. from the shaft surface.

In FIG. 8 the output values in mV are also shown with an offset. The ordinate zero is at 2500 mV. Looking at the 0 (zero) Nm curve, it reaches the same peak magnitude at each pole region but the signal polarities are opposite. Between the two regions is a smooth variation passing through zero at X=0 (allowing for experimental error). The ±80 Nm curves show the same characteristics as was exhibited in the axial field measurement. They are x-shifted with respect to the zero torque curve. At one pole region the peak of one has increased and the other decreased relative to the zero torque curve and the sense of the increase/decrease is opposite at the two pole regions. This again appears to be consistent with a tilting of the magnetic field pattern dependent on the polarity of the applied torque. The curves all come together at pivotal points or small regions P just beyond the poles.

Finally FIG. 9 illustrates that the magnetisation produced in the shaft has essentially no circumferential or tangential component $B_z$ at any value of X.

Without attempting to theorize about the nature of the torque-dependent magnetic field emanated by the transducer element 22 (the "tilt" concept is put forward as a possible effect on the field), it can be seen that both the axial field and radial field provide the potential for a magnetic-based transducer system for measuring torque. In particular the parallel straight line regions each side of the abscissa zero in FIG. 7 may be utilised for torque measurement. It has been found that within elastic limits a linear relationship between torque and magnetic output exits. Similarly the parallel straight line region extending about the abscissa zero in FIG. 8 may be used. It also provides a linear relationship between torque and magnetic output.

Figure 10:
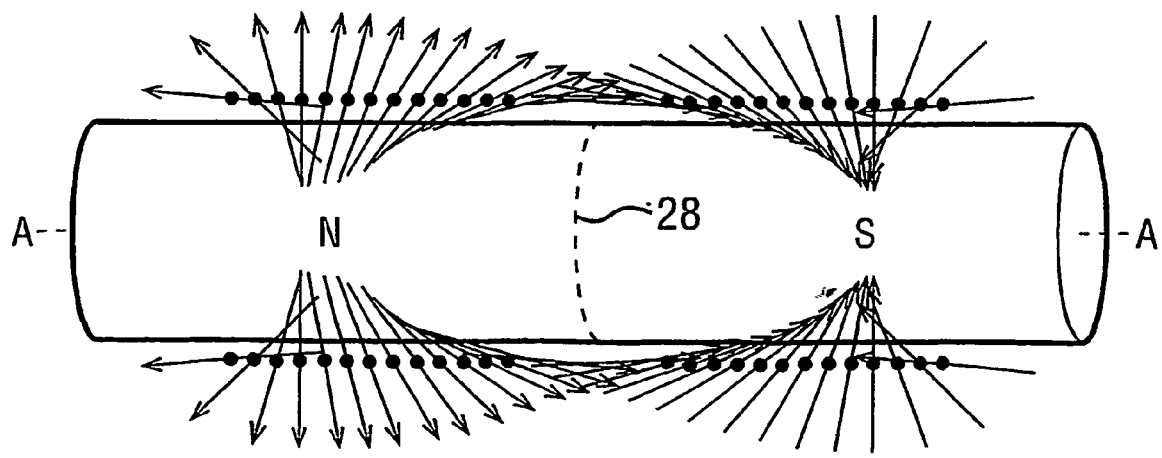
FIG. 10 is an explanatory diagram of magnetic flux direction in the vicinity of the transducer element.

In considering the results demonstrated by the curves of FIGS. 7 and 8, reference is made firstly to FIG. 10. This illustrates the magnetic flux direction represented by vector arrows measured adjacent the surface of the sensor host is (2 mm. from the shaft surface). Each spot or dot indicates an axial measurement point and each vector arrow through the spot indicates the direction of the flux at that point, though not its relative magnitude. The measurements extend over and just beyond the magnetised portion of the shaft. The poles lie in the regions marked N and S. The shaft has zero applied torque (or any other force).

The field is essentially axially directed at the centre line 28, becomes increasingly radial moving towards the poles, the radial component peaking adjacent the pole regions with zero axial component. Moving further beyond the poles the radial component decreases and the axial component increases but now in the opposite sense to that at the centre line. It must be borne in mind that FIG. 10 is concerned only with direction not with magnitude. It is considered that the vector distribution shown in FIG. 10 is consistent with the measured magnitude distributions for zero torque of FIGS. 7 and 8.

Figure 11A:
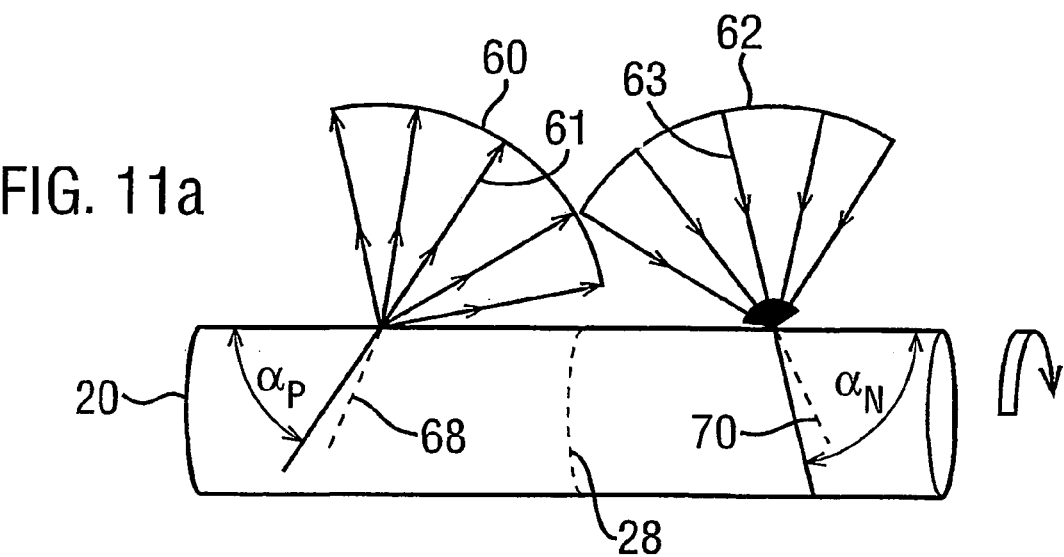
FIGS. 11a to 11c are explanatory diagrams relating to the effect of torque on the magnetic field distribution.
Figure 11B:
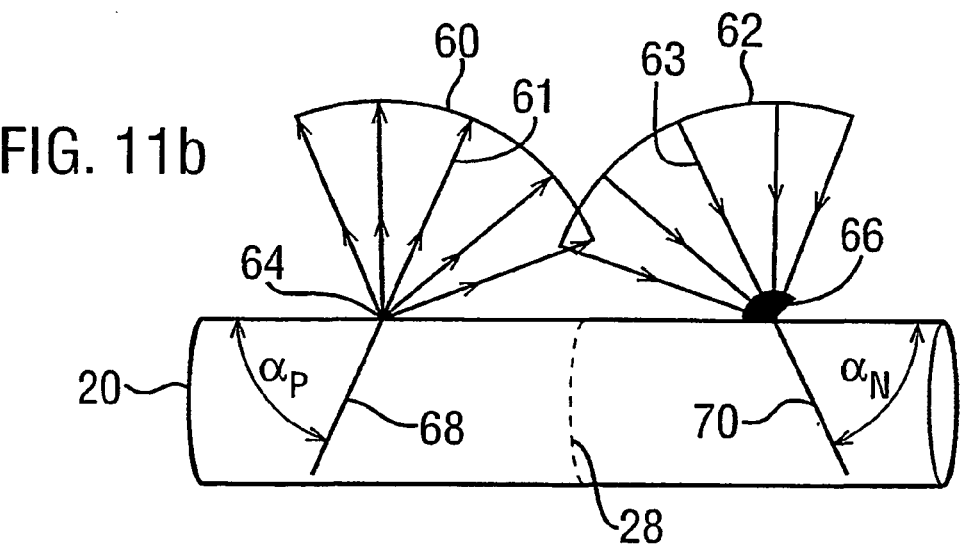
Figure 11C:
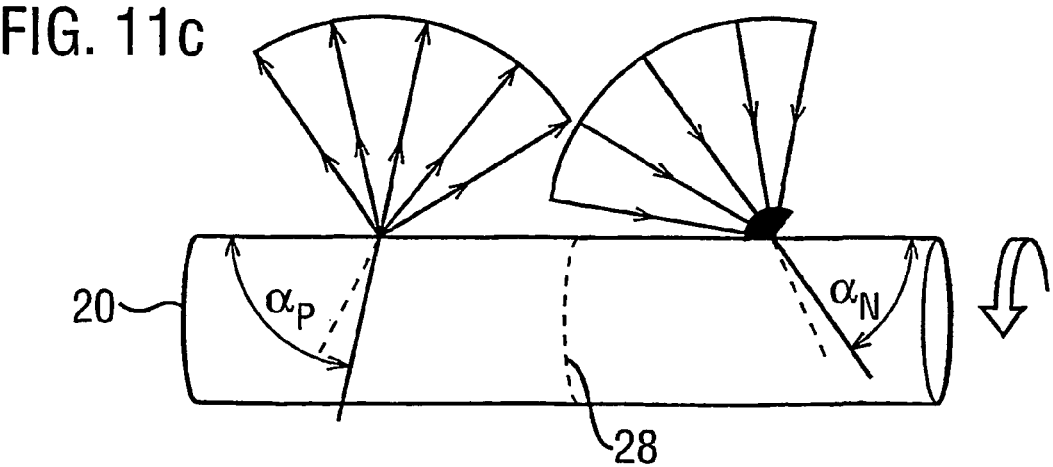

FIGS. 11a to 11c show a simplified magnetic model relating to the "tilt" concept already mentioned in regard to the change in the axial and radial field distributions under torque. FIGS. 11a-c show fields relating to torque applied in one sense (say cw), zero torque and torque applied in the other sense (ccw) respectively.

Looking first at FIG. 11b, there are shown fans 60 and 62 of magnetic flux lines taken as emanating from points 64 and 66 adjacent the poles of magnetised region 22 of the shaft. The directions of the flux lines are represented by the arrows. The magnitude of the field is not indicated. The angle of the fans is expressed with respect to a datum 68 and 70 respectively. In FIG. 11b each datum is aligned with the central arrow 61, 63 of the respective fan. Under cw torque in FIG. 11a the fans "roll" about points 64 and 66. Under no torque the two fans aligned with the datums are at the same angle (though pointing in opposite directions) to the surface of the shaft, i.e. αp=αn. Under torque they roll in the same direction so that the projected lines of the arrows 61, 63 shifts with respect to the datums 68, 70. If the angles are taken with reference to the surface of the shaft 20, the angle of αp of fan 60 decreases while the angle αn of fan 62 increases for cw torque in FIG. 11a. The converse occurs when the torque is applied in the ccw direction as illustrated in FIG. 11c.

Figure 12A:
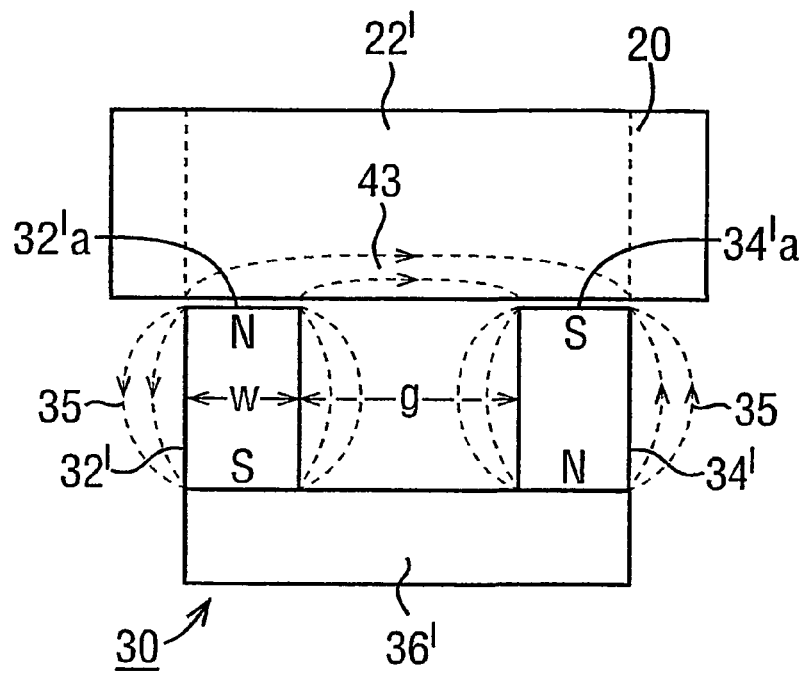
FIGS. 12a and 12b are diagrammatic illustrations for purposes of explanation of magnetic fields established in a transducer region by a magnetic source, FIG. 12b relating to the practice of the magnetisation procedure as shown in FIGS. 1 and 4.
Figure 12B:
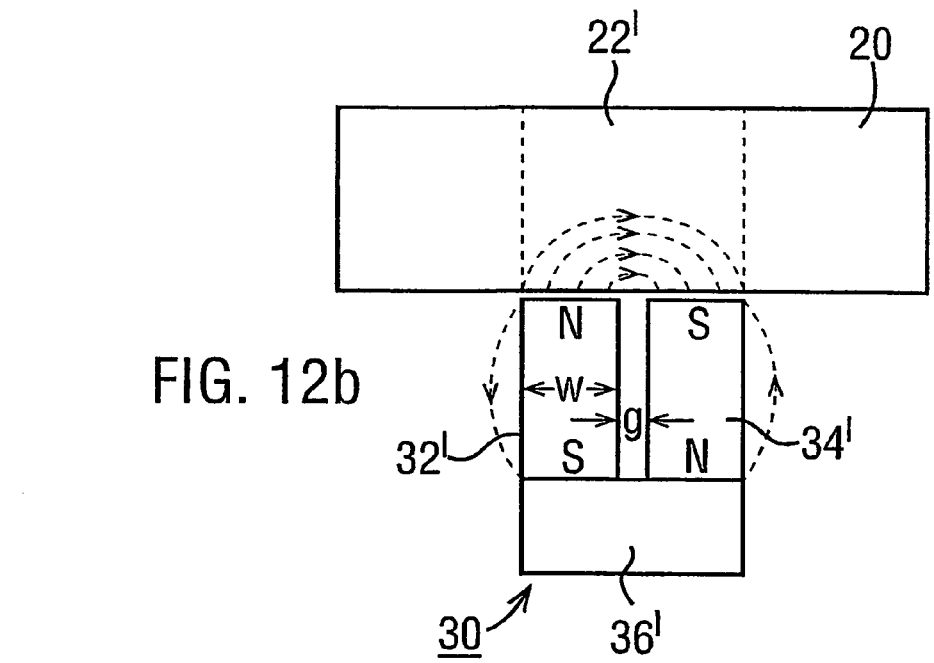

Details of a particular magnet configuration acting as a magnetic source have been given above with reference to FIGS. 1 and 2. Further explanation of the creation of the magnetised region within the shaft was given with reference to FIG. 4 and FIGS. 5a-5c. The magnetic source 30 in FIG. 4 is of a similar configuration to that seen in FIG. 1 to create a transducer element which provides an external magnetic field having the profile characteristics described above. Some further aspects of the parameters of the desired magnetic pole configuration will now be discussed with reference to FIGS. 12a and 12b which contrast a configuration in FIG. 12a, which as best presently understood does not lead to a degree of magnetisation and a field sufficient for the development of a profile-shift characteristic, with a configuration in FIG. 12b which does produce the desired external field. Referring to FIG. 12a it shows a magnetic source 30 comprising magnets 32' and 34' oppositely poled with respect to the region 22' of a shaft 20 that is to be magnetised to provide a transducer element. The magnets 32' and 34' are linked by a flux concentrator 36' to provide a U-shape magnet acting on the shaft 20. What is different about the assembly of FIG. 12a is the relatively wide gap g between the poles and particularly the pole ends 32'a and 34'a. Each magnet 32 and 34 tends to form a magnetic field 35 about itself the flux in which does not contribute to the flux available to enter and magnetise shaft portion 22' to remanance magnetisation. Furthermore the flux which does find a path through the portion 22 tends to be concentrated near the surface in a surface-adjacent zone 43. As the magnets 32' and 34' are brought nearer together (g is reduced) the flux 35 linked about each individual magnet reduces and more flux is concentrated in the portion 22' as seen in FIG. 12b and to a greater depth. This is the situation seen in FIG. 1 and FIGS. 4 and 5a-5d in which in FIGS. 1 and 4 the arrowed loops indicate the flux circulating through the magnet assembly and the adjacent portion 22' of the shaft 20. In addition the depth of magnetisation within the portion 22' is enhanced by having relatively wide (w) pole ends 32'a and 34'a. A ratio of w/g of about 7 or greater appears satisfactory.

Electromagnet Alternative

The permanent magnet assemblies so far discussed have the advantage that very high magnetic field strengths can be achieved with reasonably small dimensions. They do, however, have the disadvantage that their field strength cannot be easily altered nor can they be switched off. As an alternative an electromagnet assembly energised with direct current (D.C.) can be used as a magnetic source for the magnetic programming of the sensor host. Because of the control possible with electromagnets it becomes possible or more readily possible to match the field strength between magnets to achieve the desired sensor performance: to adjust the effective field strength between the magnet assembly and sensor host to improve significantly the rotational uniformity of the measurement signal: to adjust the desired full scale measurement range: to quicken the programming process, particularly in the withdrawal or retraction phase of Step 3) above. The electromagnet does not necessarily have to be withdrawn from the sensor host in Step 3) or advanced toward it in Step 1), but the procedure of steps 1) to 3) can be emulated by controlling the electromagnet current. Step 1) can be implemented by ramping up or increasing the energising current while the effect of the MPU retraction is obtainable by reducing or ramping down the energising current for the electromagnet. A combination of movement and current control may be employed.

The maximum flux density achievable in electromagnets is less than that in permanent magnets so that for a given usable field strength in the sensor host an electromagnet system will be physically larger than a permanent magnet one.

Pre-magnetisation Procedure

The pre-magnetisation process for the sensor host will now be described, specifically in relation to demagnetising or de-gaussing a shaft. This procedure is important to obtaining the field distribution characteristics described above. The shaft as received may have been subject to various mechanical and/or heat treatment operations which differentially affect the magnetic domains within the material. It may have been subject to and have acquired undefined magnetic fields. Such unknowns will be deleterious to transducer performance. Thus in most cases the shaft is to be put through a pre-magnetisation procedure to put it into a magnetically-defined state which has been referred to above as magnetically cleansed.

The degree of demagnetisation required is partially dependent on the magnetisation to be applied thereafter. For example if the magnetic programming to create the transducer element uses a relatively low level of magnetic field strength, the more important it becomes to completely demagnetise the sensor host. In this context magnetic cleansing means that the degaussing or demagnetisation procedure results in that the magnetic direction of the individual grains of the shaft material is random so that no grouping of magnetic domains in any particular direction exists. The existence of magnetic domain grouping to provide some organised magnetic orientation of individual grains leads to deficiencies in the magnetised transducer element. For example, increased offsets of the measured magnetic signal; non-uniformity of the signal as a function of the rotational angle of the shaft; and lower stability over time of the transducer element.

The magnetic cleansing should extend well beyond the region at which the magnetised transducer element is to be formed, e.g. preferably the whole shaft should be demagnetised so that there are no undefined local magnet systems in the sensor host. In particular "bar-magnet" formations parallel to the is shaft axis may travel over time within the shaft to affect the sensor specification on any ongoing basis.

Figure 13:
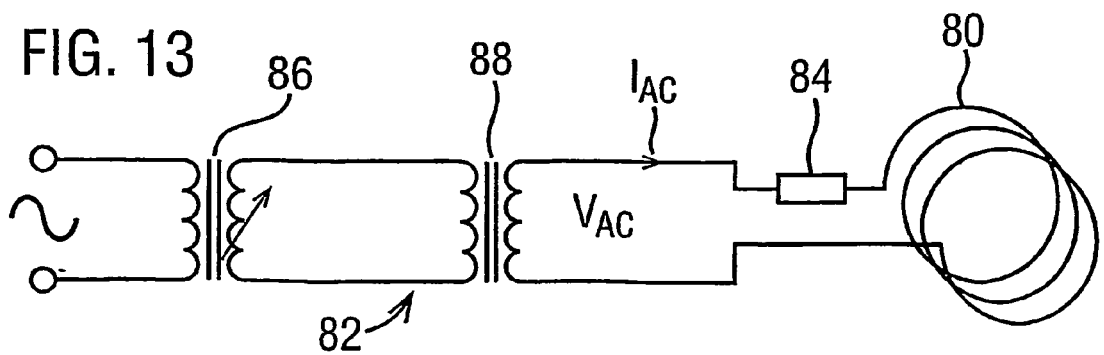
FIG. 13 is a circuit diagram of apparatus for use in a pre-magnetisation and post magnetisation procedure for a shaft.

FIG. 13 illustrates an apparatus for magnetic cleansing. It comprises a demagnetising coil 80 would in hollow solenoid fashion, a mains powered transformer arrangement 82 and a current limiter 84. For an 18 mm. diameter shaft a suitable coil was about 300 turns off about 30 cm. diameter of a heavy current carrying capacity cable. The outer conductor of a heavy coaxial cable coiled into a solenoid coil proved to be suitable. The transformer arrangement 82 comprises a variable transformer 86 connected to a 110 or 240 VAC mains AC supply. This is in turn connected to an isolation transformer 88 capable of safely delivering 10 amperes or more at its secondary at voltages at up to say 48V. The coil 80 is connected to the secondary of transformer 88 through the current limiter 84 which may be a resistor, e.g. a power rheostat or more elaborate electronic device. The current limiter may be omitted provided steps are taken to monitor the current through the coil. A typical coil resistance would be about 100 milliohms. The variability of the transformer arrangement enables the current to be controlled as desired.

The coil 80 is energised and the full length of the shaft is passed through the coil while the coil is energised at 8-10 A. This produces a degaussing field of about 1 kGauss. Typically one is looking to achieve fields in the 500-1200 Gauss range. The shaft may be mounted on a movable jig to move it along the axis of the coil and the movement continues as the far end of the shaft leaves the coil so that the field to which the shaft is subjected gradually decreases. There may be other ways of achieving the degaussing procedure including control of the coil current as a function of the axial position of the shaft with respect to the coil.

This pre-magnetisation is considered to have more general applicability to a wide range of sensor host shapes (shafts, discs etc.) and to a wide range of magnetic transducer types, including circumferentially-magnetised.

Post-magnetisation Procedure

The optional Step 4) of a post-magnetisation step following the magnetisation procedure described above is performed in the same manner as the pre-magnetisation procedure but at a lower level of magnetic field. This step may also be applied more generally to stabilise sensor hosts magnetised in other ways such as set out above.

In the post-magnetisation procedure of Step 4), the magnetised shaft is again passed axially through the energised solenoid coil 80. However, the AC current through the coil is of an order of a magnitude lower than for the pre-magnetisation procedure. In the pre-magnetisation example given above, the 8-10 A current employed for pre-magnetisation is reduced to say 0.5-1 A for post magnetisation. The current is at a value which does not change the basic magnetic pattern sought to be established but, as best can be surmised, it reduces or knocks-back parasitic fields that may be present after the magnetisation proceedings. It has been found that the post-magnetisation step improves the uniformity of the output signal with rotation of the shaft, offsets over time and the final sensor stability generally.

Reverting to the magnetisation procedure and particularly to Step 2) of it, it has already been mentioned that the distance $D_2$ (FIG. 3b) should be kept as small as possible. Actual contact with the shaft surface should be avoided. Furthermore, the distortions should be kept constant as small variations can greatly influence the flux which enters the sensor host. For example, a position control feedback system based on a laser distance sensor acting between the MPU 30 and the shaft surface can be employed. Such a system will be usable on shafts of non-circular cross-section. The field between the MPU poles and the surface of the sensor host is very large typically in the region of the ±1 kGauss to ±6 kGauss.

During the magnetisation procedure, particularly Step 2), the magnetisation achieved can be measured, for example at a point remote from the MPU 30, e.g. the opposite side of the shaft. an independent sensor device is set up at this point to measure an external field that can be correlated with the internal stored field. The magnetisation procedure can continue until some wanted sensed field is obtained. Programming by means of an electromagnet system is advantageous here in the greater control that can be exercised.

The magnetisation level in the sensor can be monitored in real time and the electromagnet current adjusted accordingly. An alternative is a stepwise approach in which the electromagnet current is set to a given magnetisation level; the electromagnet is switch off while a monitoring measurement is made; and the electromagnet is re-energised for a lower or higher level of magnetisation dependent on the measurement. The monitoring measurement and re-magnetisation steps can be repeated until the desired result is achieved.

The real time and stepwise procedures apply in the theory to the use of permanent magnets by adjustment of position but the degree of control required is more difficult to realise.

Torque Measurement Systems

The following description is concerned with the implementation of torque measurement systems based on the curves of FIGS. 7 and 8, and particularly the straight line regions of them previously noted.

Figure 14:
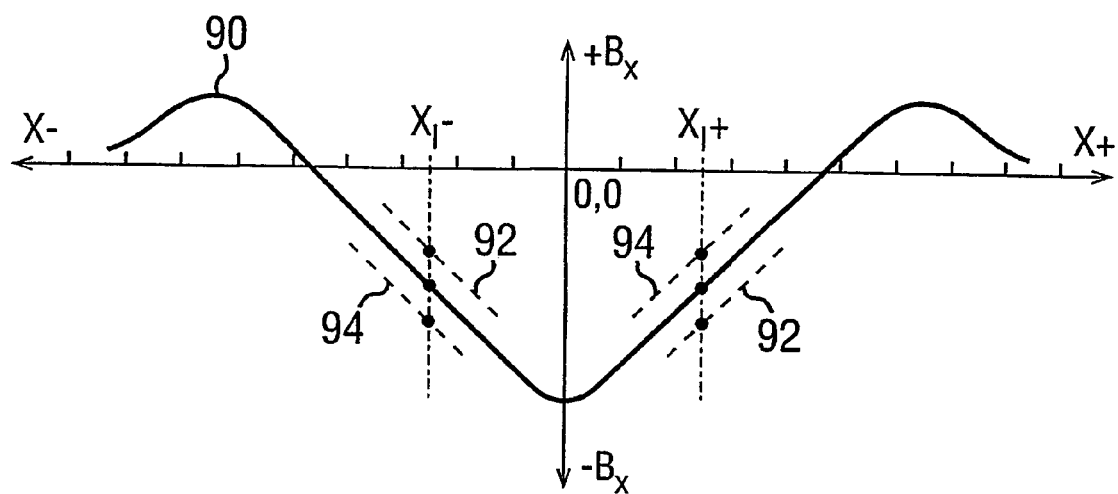
FIG. 14 is a generalised representation of the curves of FIG. 7.

FIG. 14 is a generalised representation of the axial profile curves of FIG. 7 (the polarity is reversed) in which 90 indicates the zero torque curve and 92 and 94 are relevant segments of the torque shifted curves resulting from opposite directions of torque. A sensor or array of sensors is placed in non-contacting position closely adjacent the shaft at axial positions such as $X_1+$ and $X_1-$ in the regions where the curve segments are parallel and most nearly linear. The sensors are oriented axially. Linearity of field strength with axial position at a given torque is not essential but is desirable and aids in calibration and calculation of torque values. It will be seen that a sensor placed at $X_1+$ or $X_1-$ will produce a signal representing $B_x$ that is a function of torque. The output at $X_1+$ is of opposite sign to that at $X_1-$. A sensor can be placed at each of the two positions and the signals combined to add together. This is further described below with reference to FIG. 19.

Figure 15:
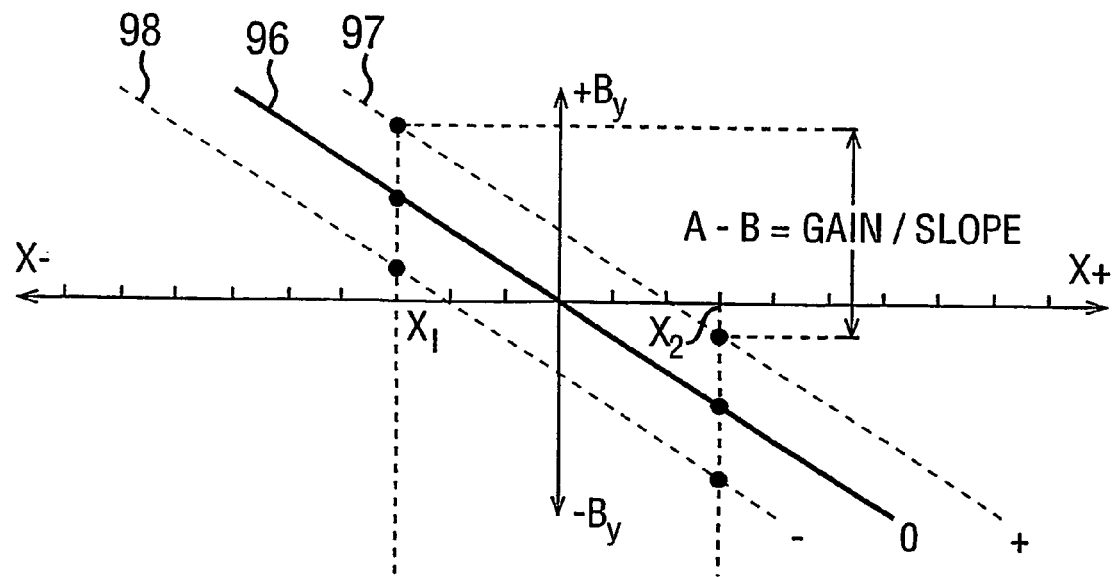
FIG. 15 is a generalised representation of the curves of FIG. 8.
Figure 16:
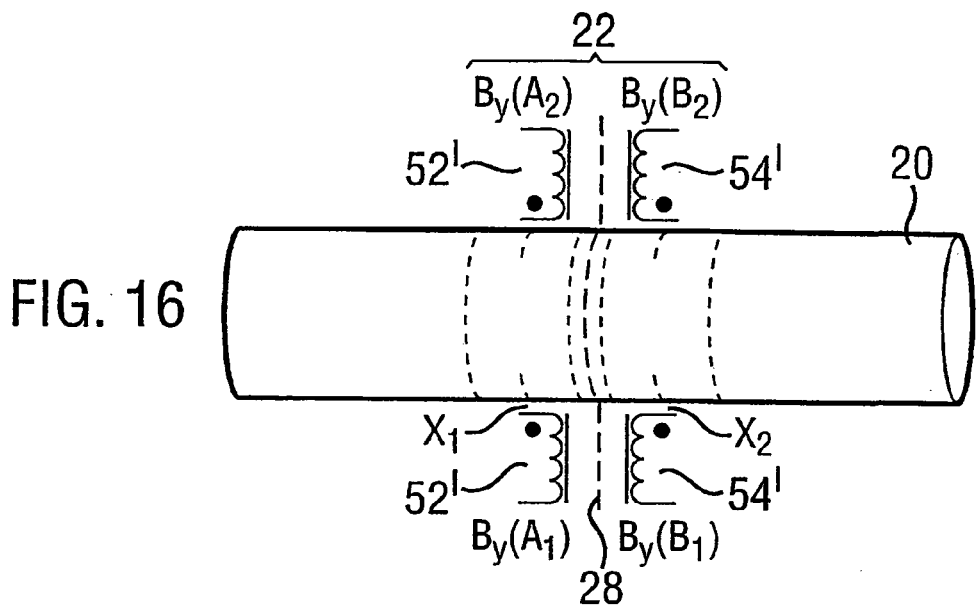
FIG. 16 shows sensor pairs for radial field measurement on the basis of FIG. 15.
Figure 17:
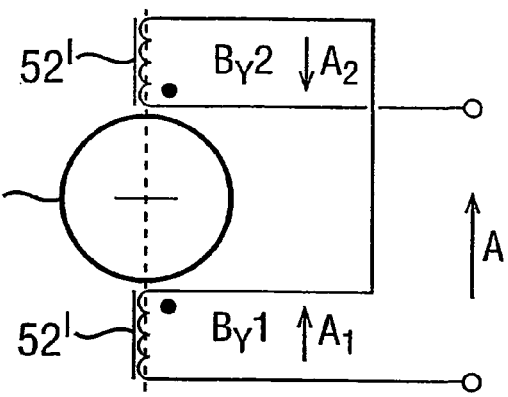
FIG. 17 shows the arrangement of one sensor pair.

The radial case is illustrated in FIG. 15 which is the central section of the curves of FIG. 8 (the polarity is reversed). 96 indicates the zero torque curve going through the origin region, and 97 and 98 relevant torque shifted segments. This is exploited as shown in FIG. 16. Single sensors or preferably opposed pairs 52', 54' of sensors are placed to each side of the centre line of the transducer element (the magnetised portion 22 of shaft 20) at positions such as $X_1$ and $X_2$, preferably of equal X magnitude from the centre plane 28. FIG. 17 shows the advantage of an opposed pair of sensors (e.g. 52') which are radially oriented and diametrically opposite. The sensor pair are connected to additively combine their opposite polarity outputs $A_1$ and $A_2$ to provide a combined signal $A=A_1+A_2$. However, common mode effects such as the Earth's magnetic field are cancelled. The outputs from the other pair of sensors are treated in the same way to obtain a combined output signal $B=B_1+B_2$.

FIG. 15 shows that the value A−B remains constant at all torque levels and represents the $B_y$ v. X slope of the curves and thus can be expressed as a "gain" factor for the transducer element. A or B or (A+B) is a torque dependent output function.

Figure 18:
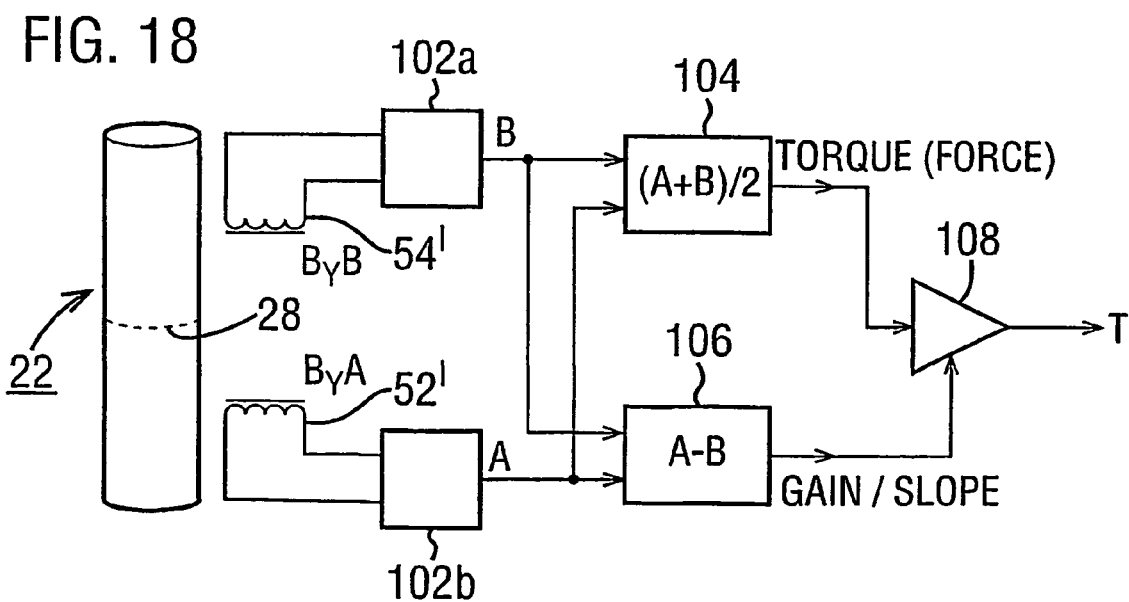
FIG. 18 shows a circuit for obtaining a gain compensated torque output signal.

FIG. 18 is a circuit diagram illustrating how these signals can be used to provide a torque output signal which is compensated for changes in the gain factor. In FIG. 17 the sensor signals A and B from the transducer element portion 22 are appropriately derived as by using the circuitry 102a, 102b, as described in WO98/52063. The two signals are applied to sum and difference units 104 and 106 respectively. The sum signal (A+B)/2 is then applied as an input to a gain-controllable amplifier 108 to which the, different unit output (A−B) is applied as a gain control signal. These functions may be performed computationally using digital values. The output T of the amplifier 108 is a torque signal T compensated for changes in the gain factor.

Reverting to the axial field distribution of FIGS. 7 and 14, FIG. 19 shows a pair of axially oriented sensors 56a, 56b located adjacent the magnetised transducer region of a shaft at positions such as $X_1$− and $X_1$+ in FIG. 14. The two sensors can be connected to measure torque (A+B)=A−(−B) and gain or slope A−B=A+(−B).

Guard/Keeper Field Regions

Mention has been made above of the provision of guard or keeper fields for the transducer element region. FIGS. 20 and 21 illustrate how this may be done.

FIG. 20 generally follows FIG. 1 but the magnet system 130 of FIG. 20 is extended by two further poles. There are four radial magnets of alternating polarity along and adjacent a shaft 120 and having a common extended flux concentrator 136. The magnetisation procedure follows the steps of FIGS. 3a-3c and is preceded and succeeded respectively by the pre-magnetisation and post magnetisation operations already described.

The magnets 132 and 134 act together to provide the magnetised region 122 for use as the transducer element. This has the external flux 140. One outer magnet 133 coacts with magnet 132 to provide a magnetised region sharing one magnet (S) of portion 122 and a further opposite polarity (N) closely adjacent to it axially. These poles are linked by flux 140' which is not used in measurement. The other outer magnet 135 similarly coacts with magnet 134 to provide a magnetised region sharing one pole (N) of portion 122 and a further opposite polarity pole (S) closely adjacent to it axially. The resultant closed loop magnetic flux patterns are shown in fine dash line in FIG. 21. The two outer keeper or guard regions 137, 139 act to prevent leaching of the active transducer region 122 and prevent unwanted fields invading region 122 along the shaft, and to generally assist in stabilising the properties of the desired transducer region. Guard regions for preventing unwanted fields invading region 122 need not be longitudinally magnetised. They may have other forms of defined magnetisation such as that known as circumferential or circular magnetisation as described in previously-mentioned PCT application published under the number WO99/56099.

DESCRIPTION OF THE PREFERRED EMBODIMENTS

Reverting to the magnetisation of a region 22 such as described with reference to FIGS. 1-5, it has been explained in step 1) of the Magnetising Procedure described above, that the shaft should be rotated at a constant angular velocity $V_1$.

The practical transducer use of the single region 22 is illustrated in FIG. 14 (with FIG. 7) and FIG. 15 (with FIG. 8) for axial and radial field profiles respectively. In each case the response of the profile to torque is the effect of axially shifting the profile. There is an additional factor which enters into these response curves. The direction of the axial shift with torque is dependent on the direction of rotation of the shaft while it is being magnetised. This is a most surprising result for which no physical explanation is presently available. However, it has been demonstrated in experiments and provides the basis of solving a problem which arises with a single transducer region 22.

The problem is the potential sensitivity of the transducer system to axial movements of the rotating shaft being measured. The extent of axial movement obviously varies greatly with the circumstances under which the shaft is used and the tolerances of a given engineering implementation of the transducer system. It will be readily realised that a need exists to separate output signal changes due to axial movement of the shaft relative to the sensor system from those due to torque. One aspect of the present invention relates to the basis of the proposed solution to this problem which is this: if two transducer elements are provided on the shaft, one being magnetised with a CW rotation of the shaft and the other being magnetised with a CCW rotation, then a shaft displacement will affect both transducers in the same sense but a given torque will affect the transducers in opposite senses. The transducer signals may be combined in the sense of adding the torque signal components while the axial displacement components act in opposition.

Figure 22:
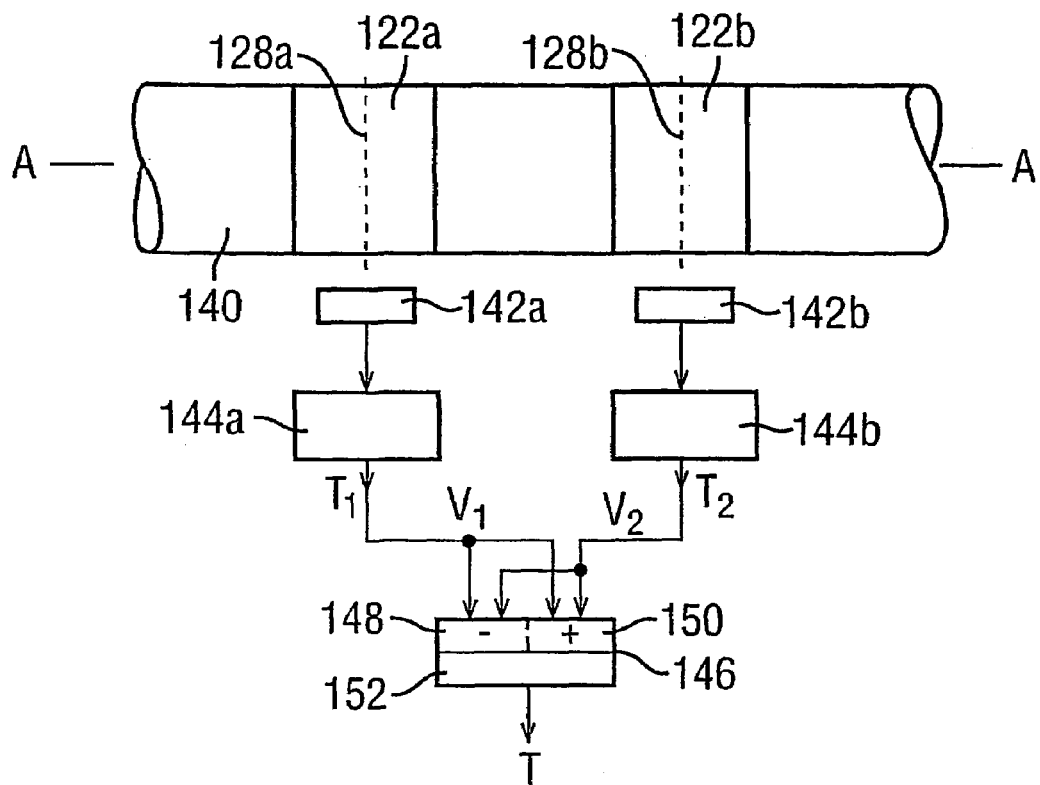
FIG. 22 shows a shaft magnetised to incorporate a pair of transducer elements providing a transducer assembly according to a first embodiment of the present invention.

The way in which this teaching can be implemented will be described with reference to FIGS. 22 and 23. In FIG. 22a shaft 140 has a pair of spaced transducer regions 122a, 122b each magnetised by the procedure above described for creating magnetised region 22 as previously described. Associated with each transducer region is a respective sensor device arrangement 142a, 142b and each is connected to a signal conditioning circuit 144a, 144b respectively to generate a respective torque output signal $v_1$, $v_2$ representing measured torques $T_1$, $T_2$ respectively. However, the torque output signals $v_1$ and $v_2$ may include a component due to axial shift of the shaft 140 relative to the sensor device arrangements. The signals need further processing eliminate, as far as possible, any component due to axial movement of the shaft 140 relative to sensor arrangements 142a, 142b and to produce an output signal T representing the torque in the shaft. This processing is performed by a circuit 146 which will be further described below after explaining the signal manipulation that is required to derive signal T. The signal manipulation can be extended to also derive the axial shift component s if required.

It is assumed that the regions 122a and 122b are magnetised to the same degree and have the same axial polarity, e.g. North poles at the left. What is different about the two regions 122a and 122b is that one is magnetised while the shaft is rotating in one direction about its axis A-A, say CW as seen from the right in FIG. 22; the other region is magnetised while the shaft is rotating in the other direction, say CCW. This difference in the direction of rotation during magnetisation produces a different direction of shift in the magnetic field profiles under torque which enables torque to be distinguished from axial movement.

This will be further explained with reference to FIG. 23. For ease of explanation, consideration will first be given to the case where the radial field profile is being sensed in accord with the response characteristic of FIG. 15 but the sensor arrangement comprises one or a pair of sensor devices (FIG. 16) to one side of the centreline 128a, 128b of regions 122a, 122b respectively. For each region the sensing is done at a distance X, from the centreline. This is the situation illustrated in FIG. 23.

Figure 23:
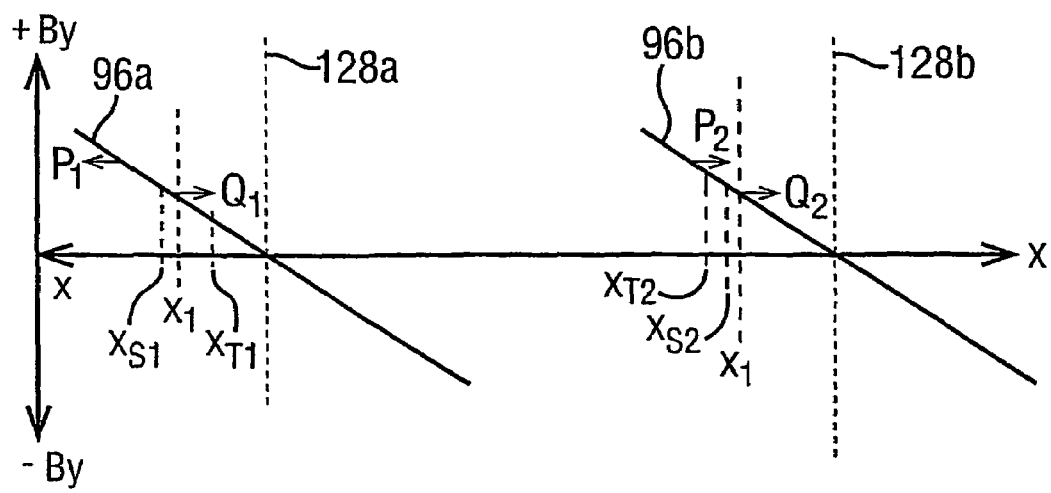
FIG. 23 illustrates the opposite polarity profile shifts of the two elements of FIG. 22, as applied in a radial profile case.

FIG. 23 shows the respective response curves 96a, 96b for the two axially spaced transducer regions 122a and 122b. The response to torque in the shaft is to shift the response profile 96a in one direction with respect to the associated sensor arrangement and to shift the response profile 96b in the opposite direction with respect to its associated sensor arrangement. This is indicated by respective arrows $P_1$ and $P_2$ applied to response curves 96a and 96b. However, for an axial displacement of the shaft, and thereby of the magnetic profiles carried thereby, the profile shift with respect to the sensor arrangements is in the same direction for both profiles as indicated by arrows $Q_1$ and $Q_2$ respectively. Thus a shaft movement axially to the right, say, effectively shifts the sensors leftward to positions $X_{s1}$ and $X_{s2}$ respectively.

The differential movement ($P_1$, $P_2$) of the profiles under torque is what has been earlier referred to as exhibiting opposite polarity profile shift. On the basis that the profile shift response is linear as already discussed, the change in output $v_1$ of the sensor responsive to profile 96a can be written as $$v_1 = k_1 T + k_2 s \tag{1a}$$

and that $v_2$ of the sensor responsive to profile 96b can be written as $$v_2 = -k_3 T + k_4 s \tag{1b}$$

where $v_1$ and $v_2$ are changes in the quiescent voltage levels applying at zero torque and zero axial shift (relative to a datum position), and T and s are the applied torque and axial displacement respectively, $k_1$ and $k_3$ are respective constants for the torque-to-voltage transfer functions of the transducer regions 122a and 122b and $k_3$ and $k_4$ are respective constants for the axial displacement-to-voltage transfer functions of the transducer regions 122a and 122b. The minus sign in the torque component of $v_2$ indicates that the torque transfer function is of the opposite sense to that for $v_1$.

A torque-indicative voltage $V_T$ is obtainable by a subtractive combination of $v_1$ and $v_2$:

$$V_T = v_1 - v_2 = (k_1 + k_3) T + (k_2 - k_4) s$$

which can be written more conveniently as $$V_T = K_1 T + K_2 s \tag{2a}$$

$K_1$ can be respectively obtained by a measurement of $V_T$ under applied torque T but with no axial displacement s: $K_2$ is obtainable by a measurement of $V_T$ under axial displacement s but with no applied torque T.

It will be noted that $k_1$ and $k_3$ are additive in the value of constant $K_1$ but it is not necessary to know $k_1$ and $k_3$ individually. If $k_1 = k_3$ then $K_1 = 2K_1$. Likewise it is not necessary to know $k_2$ and $k_4$ individually but they are subtractive so that $K_2$ will be less than either and if $k_2 = k_4$, $K_2 = 0$ in which case equation (2a) reduces to $$V_T = K_1 T \tag{2b}$$

and is unaffected by an axial movement. Even if the latter is not completely compensated the effect of axial displacement in the torque voltage $V_T$ is much reduced as compared to the measurement of $v_1$ or $v_2$ in equations (1a) and (1b).

Taking the non-ideal case where $K_2 \neq 0$, then the axial displacement component can be obtained as follows.

A displacement-indicative voltage $V_s$ is obtainable by an additive combination of $v_1$ and $v_2$:

$$V_s = v_1 + v_2 = (k_1 - k_3) T + (k_2 + k_4) s$$

Which can be written conveniently as $$V_S = K_1' T + K_2' s \tag{3a}$$

A similar line of reasoning can be followed as given above in respect of torque measurement to obtain a measurement of the axial displacement component s.

$K_1'$ can be obtained by a measurement of $V_s$ under applied torque T but with no axial displacement. $K_2'$ is obtainable by a measurement of $V_s$ under axial displacement s but with no applied torque T. $K_1'$ and $K_2'$ are obtainable simultaneously with $K_1$ and $K_2$.

It will be noted that in this case $k_2$ and $k_4$ are additive in the value of constant $K_2'$ but it is not necessary to know $k_2$ and $k_4$ individually. If $k_2 = k_4$ then $K_2' = 2k_2$ ($K_2$ being zero). Likewise it is not necessary to know $k_1$ and $k_3$ individually but $K_1$ will be less than either and if $k_1 = k_3$, $K_1' = 0$ ($K_1$ being equal to $2k_1$), then equation (3a) reduces to $$V_s = K_2' S$$

and is unaffected by torque. Even if the latter is not completely compensated the effect of torque in the displacement voltage $V_s$ is much reduced as compared to the measurement of $v_1$ or $v_2$ in equations (1a) and (1b).

By manipulation of equations (2a) and (3a) either or both of torque T and displacement s can be calculated in the case where the shaft in question is subject to both torque and axial displacement ($K_2 \neq K_1' = 0$), where $V_T$ and $V_s$ are measured voltages obtained from the transducer sensor signals:

$$\text{From equation (2a), } T = \frac{V_T}{K_1} - \frac{K_2 s}{K_1}$$

$$\text{From equation (2a) } s = \frac{V_S}{K_2'} - \frac{K_1' T}{K_2'}$$

By resolving these equations for T and s respectively $$T = V_T \cdot \frac{K_2'}{K_1 K_2 - K_2 K_1'} - V_S \cdot \frac{K_2}{K_1 K_2' - K_2 K_1'} \tag{4a}$$

$$\text{And } s = V_S \cdot \frac{K_1}{K_1 K_2' - K_2 K_1'} - V_T \cdot \frac{K_1'}{K_1 K_2' - K_2 K_1'} \tag{4b}$$

$$\text{If } K_2 = 0, \text{ then } T = V_T / K_1 \text{ and } s = \frac{V_s}{K_2'} - V_T \cdot \frac{K_1'}{K_1 K'}$$

$$\text{If } K_1' = 0, \text{ then } T = V_T \cdot \frac{K_2'}{K_1 K_2'} \text{ and } s = \frac{V_s}{K_2'}$$

Returning to FIG. 22, the functions performed by circuit 146 to implement the equations set forth above can be conveniently implemented with aid of a microprocessor and to this end the signals $v_1$ and $v_2$ are first digitized by a respective analog-to-digital converter (ADC). References to $v_1$ and $v_2$ in the next following section are to the digitised versions of those signals.

$v_1$ and $v_2$ are applied to difference and sum units 148 and 150 respectively from which signals $V_T$ and $V_S$ are obtained as given in equations (2a) and 3a) respectively. The signals $V_T$ and $V_S$ are then used by a microprocessor 152 programmed to operate on signals $V_T$ and $V_S$ in accordance with equations (4a) and (4b) to generate the torque T and shifts signals respectively as required.

It will be understood that a single microprocessor can be programmed to provide all functions within circuit 146. The respective torque and shift values T and S can be derived directly from the $v_1$ and $v_2$ inputs.

$$T = \frac{v_1}{\Delta}(K_2^1 - K_2) + \frac{v_2}{\Delta}(K_2^1 + K_2) \tag{5a}$$

-continued $$S = \frac{V_1}{\Delta}(K_1 - K_1^1) + \frac{V_2}{\Delta}(K_1 + K_1^1) \quad (5b)$$

Where $\Delta = K_1 K_2' - K_2 K_1'$.

The axial-displacement compensation technique that has been described can be employed with the more complex transducer arrangement illustrated in FIGS. 16 and 17. This arrangement involves multiple radially-oriented sensors whereby extraneous magnetic fields can be compensated and gain or slope of the transfer function can be established and changes in it can be compensated. FIG. 18 illustrates a circuit for deriving a torque-representing output signal T from the single transducer region 22. The output signal T will not be compensated in respect of any axial displacement component. The circuit of FIG. 18 can be adopted for the torque-sensing of each of two regions in which case the units 144a, 144b in FIG. 22 are each in accord with the circuit of FIG. 18. The respective output torque signals $T_1$ and $T_2$ (to follow the form of notation of FIG. 22) are in form of torque representing voltages. Each uncompensated signal $T_1$ and $T_2$ effectively becomes the signal $v_1$ and $v_2$ respectively in the processing in unit 146 in accord with the equations given above.

Torque measurements can also be obtained based on axial profile measurements. The axial profile is discussed above with reference to FIG. 7 and the generalised profile of FIG. 14. Compensated measurement of torque for a single transducer region is described with reference to FIG. 20. The compensation is again for the effective gain or slope of the transducer transfer function. The measured output does not include compensation for axial displacement which again has the effect of shifting the sensor device(s) relative to the magnetic profile whose torque-dependent axial shift is to be measured. The approach adopted above to compensate for axial displacements to obtain a more accurate torque dependent output is also applicable to the axial profile case.

Continuing from the measures described above to separate axial shift or displacement from torque-induced profile shift in a magnetic transducer, there will now be described a further embodiment of the invention. It builds upon the disclosure above relating to compensating axial shift of a shaft which has two transducer regions exhibiting magnetic field profile shift in opposition directions.

There will now be disclosed a system in which the foregoing teaching is further developed to provide a system which enables a shift-compensated torque measurement to be made or which enables a shift measurement to be made independent of torque or which enables both these measurements to be realised. The further embodiment will be described with reference to FIGS. 24-29 of the accompanying drawings.

The profile shift form of longitudinal magnetisation can be exploited where an axial displacement or acceleration is a parameter to be measured. It has been found that an accurate and repeatable measurement of axial shift can be obtained, moreover with an output that is a linear function of the shift. In this respect, what is measured is relative axial shift between the transducer elements and the sensor system and for the purposes of explanation the sensor system will be taken as fixed and cooperating with a shaft subject to torque applied about its longitudinal axis and also to axial displacement, the shaft carrying a pair of integral transducer elements of the kind already described. The one and the other transducer elements are magnetised while the shaft is clockwise and counterclockwise rotated respectively as previously described.

Figure 24:
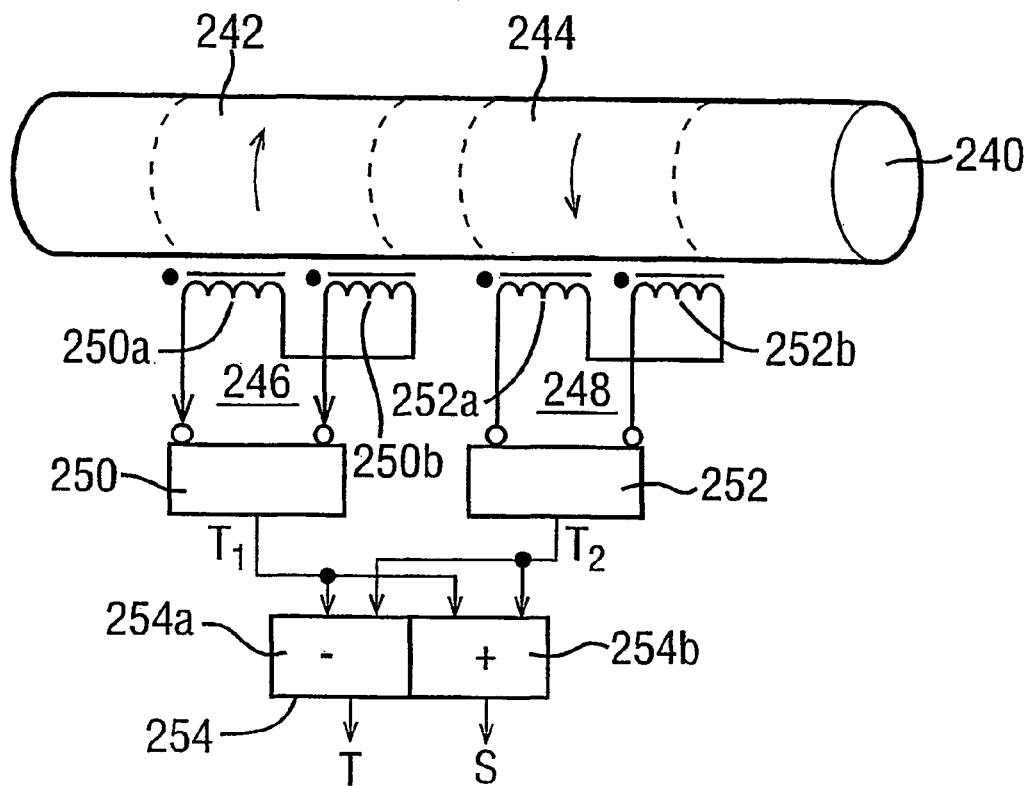
FIG. 24 shows a magnetic transducer system according to a second embodiment of the invention for providing both torque and axial shift output signals.

Referring to FIG. 24, this shows a shaft 240 having two integral regions 242 and 244 which have been magnetised as previously described with reference to FIGS. 1-6d to act as transducer elements exhibiting the profile shift characteristics of FIGS. 7 and 8. For the purposes of the embodiment to be described, the characteristic that is employed is the axial profile shift of FIG. 7. The regions 242 and 244 are respectively magnetised with the shaft rotating in one direction and the other as indicated by the arrows. The regions are magnetically polarized in the same direction with respect to the shaft axis, for example North to the left in the figure and South to the right. As already described, due to the opposite direction of rotation while undergoing magnetisation, the profiles of regions 242 and 244 move in opposite directions under a common torque applied to the shaft.

The transducer regions 242 and 244 cooperate with respective sensor assemblies 246 and 248. Each comprises a pair of axially-oriented coils (saturating inductors) 250a, 250b and 252a, 252b respectively. In each pair the coils are connected in series in the sense shown into a signal processing (conditioning) circuit 250 and 252 respectively of the kind disclosed in PCT published application WO98/52063. Units 250 and 252 produce a torque-dependent output signal $T_1$ and $T_2$ respectively in response to torque applied about the longitudinal axis of shaft 240. These signals are combined in unit 254 to provide outputs T and S representing torque and axial position respectively.

Figure 28:
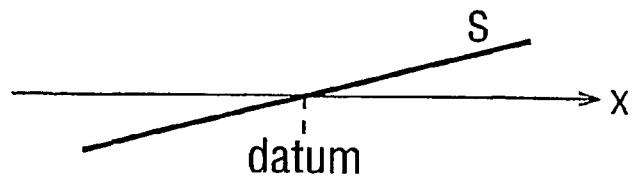

In order to better explain the manner in which the output signals are obtained reference is made to FIG. 25 which follows FIG. 14 and illustrates an axial field profile applicable to both of regions 242 and 244, and to FIG. 28 which graphically illustrates curves of the output signals $T_1$ and $T_2$ as a function of torque.

Referring to FIG. 25, two response profiles are shown, each being a plot of voltage output with axial position for a single coil, axially oriented sensor such as is 50x in FIG. 6a, for example. The two profiles are identical. That at the left is annotated to accord with the operation of the transducer including region 242: that to the right pertains to the operation of the transducer including region 244. For a pair of coils, such as coils 250a and 250b in assembly 246 and coils 252a and 252b in assembly 248, the two coils are axially spaced apart by a distance p, say equal to the distance between the sweet spots 230 described below with reference to FIG. 30. However, the spacing p may be taken at any value within a range such that when the transducer assembly is set up the two coils of each coil assembly lie on the linear slopes of the response and are symmetrically disposed about the centre line L of the relevant transducer response.

The coils of each pair are positioned to operate at points $x_o-$ and $x_o+$ on the relevant response curve. These points may be but do not have to be at the sweet spots. Points $x_o-$ and $x_o+$ are at an equal level represented by horizontal line M. At zero torque the circuits 250 and 252 produce equal outputs $T_1$ and $T_2$ at point $T_1$ in FIG. 26.

If the shaft 240 is subject to torque, the response profiles are shifted relative to the stationary sensor assemblies, but it is easier to consider the sensor assemblies as being shifted relative to the profiles to positions $x_1-$ and $x_1+$ to operate on the linear portions of the profiles at the points shown by the projected vertical lines (all the shifts are exaggerated for clarity of illustration). Operation on the linear part of the slopes is maintained in FIG. 25 and FIG. 27. The new operating points are at different levels. As shown the profile associated with region 242 shifts in the opposite direction to that associated with region 244 in response to the torque common to both so that the shift in the operating points is of the opposite sense and the output signal level shift is of opposite sense to that of region 242. Consequently the linear curve representing $T_1$ as a function of torque is of opposite slope to that representing. $T_2$ as is depicted on FIG. 26. Both curves represent a response having the same output signal values relative to the $T_o$ level for a given torque but with opposite polarity. In order to remove the $T_o$ component the torque outputs $T_1$ and $T_2$ are subject to a difference operation in part 254a of unit 254 to obtain a torque output T ($=T_1-T_2$). The torque output T is also shown on FIG. 26 with the signal T having the value zero at zero torque. The sign of T indicates the direction of the torque (cw or ccw).

Figure 26:
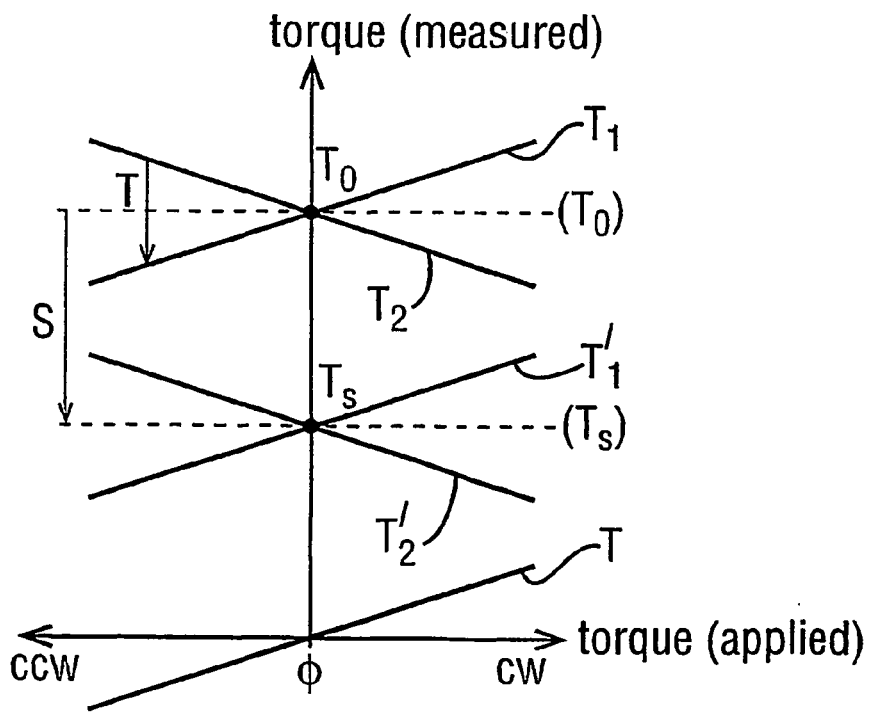
FIGS. 26 and 28 graphically show output curves relating to the operation of the system of FIG. 24.

Attention can now be given to the effects of an axial shift or displacement of the shaft. This will be discussed with reference to FIG. 27 which shows the same profiles as FIG. 25 and the same initial positioning of the sensors at operating points $x_o-$ and $x_o+$ on the profiles. In this case the shaft is axially shifted relative to the profiles to sensor positions $x_2-$ and $x_2+$. As in the torque-dependent shift case of FIG. 25, the operating points on each profile shift in opposite directions as indicated by the vertical line projections but most importantly, unlike FIG. 25, the shifts in the two profiles are of the same sense. The consequence of this is that the outputs $T_1$ and $T_2$ or circuits 250 and 252 change by the same magnitude and in the same sense. This is represented in FIG. 26 by an output signal shift due to an axial displacement at zero torque to a point $T_s$ applicable to both transducers. $T_s$ is shown at an arbitrary position for clarity of illustration of salient features of FIG. 28. If torque is now applied to the shaft 240 while it remains subject to this same axial displacement, there results linear torque curves $T_1'$ and $T_2'$ generated by the outputs of circuits 250 and 252 respectively. The curves $T_1'$ and $T_2'$ are identical with $T_1$ and $T_2$ above in FIG. 26 other than being vertically shifted by a constant equal to $(T_s-T_o)$.

Thus torque T can be equally obtained from the difference between the $T_1$ and $T_2$ outputs irrespective of the axial position of the shaft, e.g. the value of $T_o$ and $T_s$. The differencing step at 254a renders the torque output substantially independent of any axial shifts that may occur. An axial shift affects signal outputs $T_1$ and $T_2$ in the same sense and is cancelled out.

It has also been found that the difference $(T_s-T_o)$ at zero torque, or at any given torque, is an accurate measure of axial shift s relative to a given datum such as that represented by $T_o$. Consequently reverting to FIG. 26 if the upper curves representing signal outputs $T_1$ and $T_2$ are summed $(T_1+T_2)$ there is obtained a constant value output at the level $T_o$ (strictly $2T_o$ but the scaling factor of 2 is ignored as irrelevant to the principle of what is being expounded). Similarly at a shifted position represented by level $T_s$, the summing of the $T_1+T_2$ outputs $(T_1'+T_2')$ provides a constant value output at level $T_s$. FIG. 28 shows a graph of axial shift s against x as derived from the output signals $T_1$ and $T_2$ of circuits 250 and 252 as applied to a summation circuit 254b. Thus the transducer assembly and circuitry described provides the possibility of 1) measuring torque compensated against axial shift
2) measuring axial shift unaffected by torque
3) measuring both 1) and 2).

The embodiment above described has the two transducer regions 242 and 244 magnetised with like polarity along the axis, N-S and N-S. The teaching given above is applicable to the case where the two transducer regions have like poles adjacent, e.g. N-S and S-N. This results in the response profile of one region being inverted with respect to the other requiring a compensating reversal in the polarity of the signals from one transducer to obtain the operation above described.

In another modification of the above described embodiment, the two sensor systems 246 and 248 can themselves be connected in series, with appropriate polarity, to a single signal processing (conditioning) circuit to obtain a sum output $(T_1+T_2)$ or a difference output $(T_1-T_2)$.

In the case where the transducer regions 242-244 have like poles adjacent, this provides the possibility of magnetising the regions with a double u-shaped magnet arrangement having a common centre magnet for forming the two like adjacent regions. This centre magnet may be given an extended axial length for this purpose.

The axial shift measurement aspect of the embodiment described above can be put to use in an accelerometer in which a movable member is mounted to be displaced in proportion to an acceleration generated force. An example of this is shown diagrammatically in FIG. 29.

Figure 29:
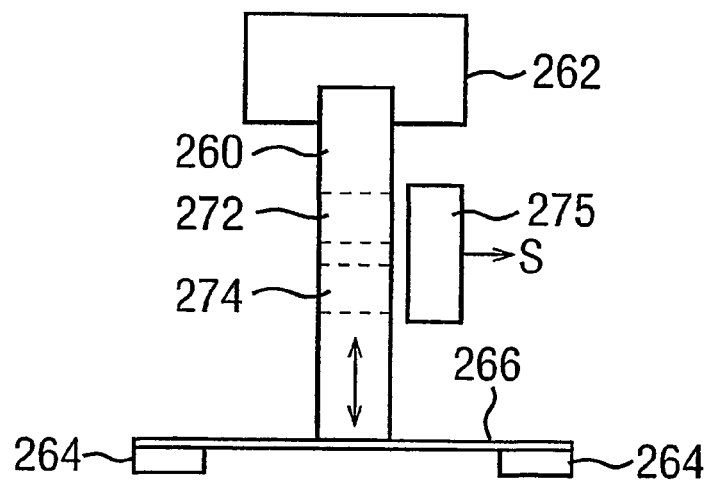
FIG. 29 shows an accelerometer embodying the axial displacement measurement aspect of the present invention.

In FIG. 29 an elongate member 260 (shaft) is mounted between a mass 262 subject to forces which accelerate it with respect to a base 264. One end of the shaft 260 is mounted to the mass 262 and the other end to a flexible support or diaphragm 266 supported by the base 264 so as to be capable of flexing with respect to the base under accelerative forces generated by the mass 262. In the example illustrated, the shaft 260 is mounted for vertical movement under such forces as indicated by the double-headed arrow. The shaft has two transducer regions 272 and 274 magnetised in the manner of regions 242 and 244 and co-operating therewith a sensor assembly and signal processing circuitry 275 which operate as described above and from which an axial shift output s for shaft 260 is obtained as a measure of relative acceleration between mass 262 and base 264.

The above-described developments in axial shift compensation and axial shift measurement have been given in respect of transducers utilising the axial (in-line) profile shift response. The same principles are applicable to the radial profile shift response (FIGS. 8, 15) which also exhibit the characteristic that the profile shifts in opposite directions relative to the respective sensor assemblies for two transducer regions under a common torque, the regions having been magnetised under opposite directions of rotation; but that the profile shifts in the same direction relative to the respective sensor assemblies for an axial displacement of the shaft.

Other aspects of the invention arise out of a finding that the use of magnets to magnetise (encode) a rotating shaft can result in the generation of eddy currents in the shaft. An example of this has been found in the magnetisation procedure described above with reference to FIGS. 1-3c.

One practical way of rotating the shaft relative to a fixed permanent magnet assembly is to mount it in a lathe. Rotational speeds of 3000 r.p.m. and greater have been used. Adaptation of ordinary lathe machines for this purpose provides conductive contact with the ends of the shaft and a closed electrical path through the machine. What has been found is that on shafts where the axial length of magnetised region is a significant proportion of the shaft length, high eddy currents may be set up in the shaft which have any axial component along the shaft which then flows through the external machine path. These currents have been measured in the range 10 to greater than 100 Ampere. What creates a problem is that the current is non-uniform due to variations in the external path resistance, e.g. through lathe bearings. These short-term fluctuations can create non-uniformity of the induced magnetisation (FIGS. 5a-5d) as a function of angle about the shaft axis. That is the magnetisation as a function of angle is modulated.

A consequence of this unwanted modulation of the magnetisation of the transducer region is the modulation of the output signal when torque is measured in a rotating shaft. Two aspects of the invention relate to measures to mitigate this problem.

In order to deal as far as possible with this problem at source, rather than rely entirely on electronic processing of the output signal of the transducer assembly, two solutions are proposed. A first is to mount the shaft in non-electrically conductive contact with the lathe or other machine for rotating the shaft, with the intention of preventing axial current flow. A second, which has been applied to the lathe used to rotate the shaft, in magnetising experiments has been to have a pair of conductive brushes or brush arrays placed at opposite ends of the shaft and electrically connected together to provide a uniformly conductive external path with the intention of ensuring a uniform eddy current component flow while the shaft is rotating at constant velocity under the influence of the magnet assembly. The achievement of the uniform current flow will assist the achievement of a uniform magnetisation about the axis of the shaft.

Specific work done to date has used a respective array of brass brushes at each end of the shaft. The shaft was of the FV520B high performance steel mentioned above.

Mention has also been made of the possible use of electromagnets in the magnetisation procedure. The proposals made above may also be applied in this case but the problem may be a lesser one due to the fact that the electrical energisation of the magnets for the magnetisation of the transducer region of the shaft is normally going to be of very short duration, typically 1 mS or even less.

The earlier description referred to three orientations of magnetic field sensors: axial or in-line (x direction in FIGS. 9A and 9B), radial (y direction) and tangential (z direction). Both the axial and radial orientations yield the torque sensitive field profile shift as shown in FIGS. 7 and 8 respectively. The description of FIGS. 14-19 gives more detail of the implementation of practical measurement techniques using the axial and radial field profiles.

What will now be described in yet another aspect of the invention is additional measures to optimise the placement of sensors with respect to the field profile and more particularly the axial or in-line profile. It will be recalled that in the axial field case two axially spaced sensors (or groups of sensors) were used which were positioned in one or both locations $x_1+$ and $x_1-$ in FIG. 14. Sensors in both positions are shown in FIG. 19 and their signals combined.

These teachings have been implemented in a particular way in the embodiment of FIGS. 24-28 where reference was made to the placement of sensors at "sweet spots".

Figure 31:
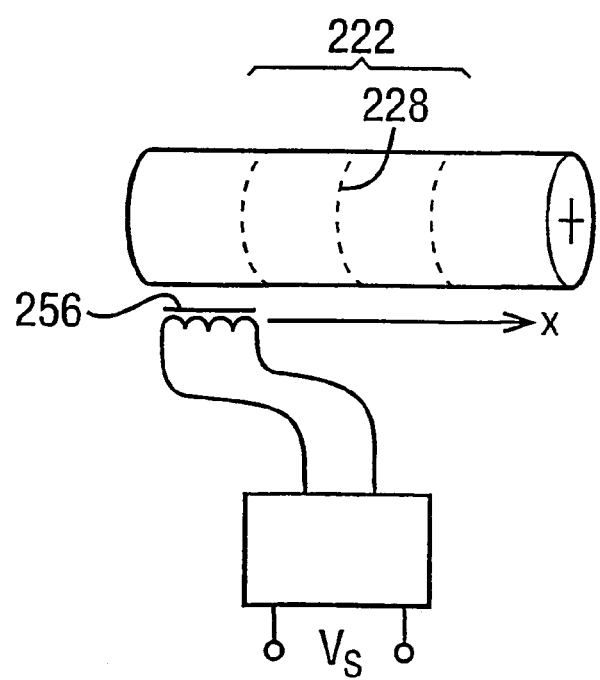
FIG. 31 illustrates the measurement system used in obtaining the curves of FIG. 30.

Ideally the same field profile such as that of FIGS. 7 and 14 will be obtained whatever the angular position of the shaft. In practice that field profile may be modulated (for whatever reason) as a function of shaft angle. So that there is a non-uniformity seen in the curves of in FIG. 30 which shows signal measurements taken as a sensor is axially moved adjacent the shaft and along the transducer region. More particularly the measurement set up used is illustrated in FIG. 31. The transducer region 222 has a centreline 228. An axially oriented sensor (256) is moved in the axial (x) direction. A single inductor coil was employed in a saturating-core type of circuit of the kind previously mentioned. It had an inductance of about 220 μH. The core was 8 mm long and the coil body was 6 mm long and less than 2 mm in diameter. The spacing $D_s$ between the coil axis and the shaft surface was 2.5 mm. Because of the real physical size of the sensor the measured profiles represent a local averaging over the length of the coil. The sensor was connected in an appropriate circuit to provide a signal output $V_s$.

The shaft used in obtaining the curves of FIG. 30 of 18 mm diameter FV520B steel magnetised with two magnets at a shaft rotation speed of 3000 r.p.m. The shaft was mounted on a lathe. It was not provided with the eddy current measures described above. The shaft was magnetised with two magnets of in excess of 4500 Gauss strength, each having an axial pole length of 15 mm and a spacing between the poles of 2 mm.

At each axial position x of the sensor, the output $V_s$ was examined as a function of the rotational angle of the shaft. There is a variation of output with rotational angle. FIG. 30 illustrates a curve 210 of maximum amplitude, a curve 212 of minimum amplitude, and a curve 214 of intermediate amplitude. Although the amplitude variation as a function of angle can be dealt with by a filtering of the output, the curves lead to a more advantageous solution.

What is notable about the curves of FIG. 30 is that at a distance of ±10 mm from the centreline of the transducer region there is a "sweet spot" 230 where the amplitude variation is at a minimum. The curves virtually coincide at a respective point each side of the centreline. Thus it is suggested that the axially spaced sensors at $x_1+$ and $x_1-$ in for example FIGS. 14 and 19 should be located in alignment with the sweet spot points to minimize amplitude variation. It is also to be observed that the sweet spots occur at points where the torque related measurable magnetic signal from the transducer region has the steepest slope and where any parasitic effects are at the lowest value. In other words the sweet spots are points where the optimum signal-to-noise ratio can be expected. In the example quoted the sweet spots are at about 0.6 of the axial extent of the permanent magnet assembly from the centreline or at a distance from the centreline of about two-thirds the axial length of the magnet pole.

It has been found that the axial location of the sweet spot points is a function of the distance $D_s$ between the sensor and the shaft surface. This variation is thought to be due to the curvature of the magnetic flux as the distance from the transducer region increases. The sweet spots move apart from the centreline as the distance $D_s$ increases. However, they still remain the points of greatest slope and signal-to-noise ratio. This assumes that the sensor(s) at each sweet spot point are at the same distance from the shaft. The field measured will itself decrease as the distance $D_s$ decreases.

Better results have been obtained when each sensor at $x_1+$ and $x_1-$ respectively, comprises two combined sensor devices (of the inductive kind described) located diametrically opposite about the shaft.

It is to be noted that the sweet spots 230 may be located at the point of zero detected flux B—see FIG. 14. The curves in FIG. 30 have the $V_s$ value corresponding to zero flux at some offset value (nominally 2500 mV). Operating at the zero flux point under no torque does not itself present a problem in detecting profile shift due to torque, provided that the curves are of linear slope at the operating point.

The invention claimed is:

1. A method of magnetizing a portion of an electrically conductive, ferromagnetic member comprising:

magnetizing a portion of said member to establish an annulus of stored magnetization about an axis of said portion, the magnetizing of said portion comprising relative rotation of said member and a magnet system about said axis; and establishing an external electrically conductive path from regions of said member between which said annulus is formed during magnetization of said portion.

2. A method as claimed in claim 1 in which the magnet system is a permanent magnet assembly and said member is rotated relative with respect thereto, and said electrically conductive path includes brush means making electrical contact with said regions.

3. A method as claimed in claim 1 in which said member is rotated with respect to the magnet system, and said electrically conductive path includes brush means making electrical contact with said regions.

4. A method of magnetizing a portion of an electrically conductive, ferromagnetic member to establish an annulus of stored magnetization about an axis of said portion, wherein the member is rotated about said axis during magnetization, and wherein the member is electrically isolated from means for rotating the member during magnetization of said portion.

5. A method as claimed in claim 1 further comprising preparing the magnetizable member for magnetization by the steps of energizing a coil having an aperture therethrough with A.C. and passing said member though said aperture.

6. A method as claimed in claim 5 in which said coil is energized to generate 2000 Ampere-turns or more.

7. A method as claimed in claim 6 in which said coil is wound in the form of a solenoid, said member is a shaft and said member is moved axially though said solenoid.

* * * * *